US011960290B2

(12) United States Patent
Laddha et al.

(10) Patent No.: US 11,960,290 B2
(45) Date of Patent: Apr. 16, 2024

(54) SYSTEMS AND METHODS FOR END-TO-END TRAJECTORY PREDICTION USING RADAR, LIDAR, AND MAPS

(71) Applicant: UATC, LLC, San Francisco, CA (US)

(72) Inventors: Ankit Laddha, Pittsburgh, PA (US); Meet Pragnesh Shah, San Francisco, CA (US); Zhiling Huang, Pittsburgh, PA (US); Duncan Blake Barber, Pittsburgh, PA (US); Matthew A. Langford, Pittsburgh, PA (US); Carlos Vallespi-Gonzalez, Wexford, PA (US); Sida Zhang, San Francisco, CA (US)

(73) Assignee: UATC, LLC, San Francisco, CA (US)

( * ) Notice: Subject to any disclaimer, the term of this patent is extended or adjusted under 35 U.S.C. 154(b) by 641 days.

(21) Appl. No.: 17/095,227

(22) Filed: Nov. 11, 2020

(65) Prior Publication Data

US 2022/0035376 A1    Feb. 3, 2022

Related U.S. Application Data

(60) Provisional application No. 63/107,907, filed on Oct. 30, 2020, provisional application No. 63/057,632, filed on Jul. 28, 2020.

(51) Int. Cl.
*G05D 1/02* (2020.01)
*G01S 13/86* (2006.01)
(Continued)

(52) U.S. Cl.
CPC .......... *G05D 1/0221* (2013.01); *G01S 13/865* (2013.01); *G05D 1/0088* (2013.01);
(Continued)

(58) Field of Classification Search
None
See application file for complete search history.

(56) References Cited

U.S. PATENT DOCUMENTS 10,732,261 B1 * 8/2020 Wang ..................... G01S 13/931
11,427,210 B2 * 8/2022 Rosman .............. B60W 60/001
(Continued)

OTHER PUBLICATIONS

Richards et al., "Constant false alarm rate (CFAR)", Principles of Modern Radar, SciTech Publishing, Edison, New Jersey, 2010, (pp. 69, 96, 460, 532, 590-593, 595-597, 601-603, 607-619, 666, and 717), 31 pages.
(Continued)

*Primary Examiner* — Bernarr E Gregory
(74) *Attorney, Agent, or Firm* — Dority & Manning, P.A.

(57) ABSTRACT

Systems and methods for trajectory prediction are provided. A method can include obtaining LIDAR data, radar data, and map data; inputting the LIDAR data, the radar data, and the map data into a network model; transforming, by the network model, the radar data into a coordinate frame associated with a most recent radar sweep in the radar data; generating, by the network model, one or more features for each of the LIDAR data, the transformed radar data, and the map data; combining, by the network model, the one or more generated features to generate fused feature data; generating, by the network model, prediction data based at least in part on the fused feature data; and receiving, as an output of the network model, the prediction data. The prediction data can include a respective predicted trajectory for a future time period for one or more detected objects.

19 Claims, 9 Drawing Sheets

(51) Int. Cl.

| | |
|---|---|
| *G05D 1/00* | (2006.01) |
| *G06F 18/2413* | (2023.01) |
| *G06F 18/25* | (2023.01) |
| *G06N 5/04* | (2023.01) |
| *G06N 20/00* | (2019.01) |
| *G01S 13/00* | (2006.01) |

(52) U.S. Cl.
CPC ..... *G05D 1/0257* (2013.01); *G06F 18/24147* (2023.01); *G06F 18/251* (2023.01); *G06N 5/041* (2013.01); *G06N 20/00* (2019.01)

(56) References Cited

U.S. PATENT DOCUMENTS

| | | | | |
|---|---|---|---|---|
| 11,521,396 | B1* | 12/2022 | Jain | G06F 18/2415 |
| 2018/0024239 | A1* | 1/2018 | Branson | G01S 17/931 |
| | | | | 701/23 |
| 2018/0024569 | A1* | 1/2018 | Branson | G01S 13/931 |
| | | | | 701/23 |
| 2018/0074506 | A1* | 3/2018 | Branson | G01S 17/931 |
| 2018/0211128 | A1* | 7/2018 | Hotson | G01S 17/931 |
| 2018/0260702 | A1* | 9/2018 | Yamamoto | G06N 3/084 |
| 2019/0061771 | A1* | 2/2019 | Bier | G05D 1/0088 |
| 2019/0318206 | A1* | 10/2019 | Smith | G01S 17/931 |
| 2019/0359208 | A1* | 11/2019 | Sapp | G01S 13/931 |
| 2019/0382007 | A1* | 12/2019 | Casas | G06V 20/58 |
| 2020/0142408 | A1* | 5/2020 | Valois | G05D 1/027 |
| 2021/0141092 | A1* | 5/2021 | Chen | G06F 18/251 |

OTHER PUBLICATIONS

Casas et al., "IntentNet: Learning to Predict Intention from Raw Sensor Data", 2nd Conference on Robot Learning (CoRL), 2018, 10 pages.
Chadwick et al., "Distant Vehicle Detection using Radar and Vision", International Conference on Robotics and Automation (ICRA), 2019, Montreal, Canada, pp. 8311-8317.
Chai et al., "MultiPath: Multiple Probabilistic Anchor Trajectory Hypotheses for Behavior Prediction", $3^{rd}$ Conference on Robot Learning (CoRL), 2019, 14 pages.
Chavez-Garcia et al., "Multiple Sensor Fusion and Classification for Moving Object Detection and Tracking", IEEE Transactions on Intelligent Transportation Systems, 2015, pp. 525-534.
Cho et al., "A Multi-Sensor Fusion System for Moving Object Detection and Tracking in Urban Driving Environments", IEEE International Conference on Robotics and Automation (ICRA), 2014, pp. 1836-1843.
Gohring et al., "Radar/Lidar Sensor Fusion for Car-Following on Highways", 5th International Conference on Automation, Robotics and Applications, 2011, Wellington, New Zealand, pp. 407-412.
Gupta et al., "Social GAN: Socially Acceptable Trajectories with Generative Adversarial Networks", IEEE International Conference on Computer Vision and Pattern Recognition (ICCVPR), 2018, pp. 2255-2264.
Hong et al., "Rules of the Road: Predicting Driving Behavior with a Convolutional Model of Semantic Interactions", IEEE International Conference on Computer Vision and Pattern Recognition (ICCVPR), 2019, pp. 8446-8454.
Lang et al., "PointPillars: Fast Encoders for Object Detection from Point Clouds", IEEE International Conference on Computer Vision and Pattern Recognition (ICCVPR), 2019, pp. 12689-12697.
Lee et al., "DESIRE: Distant Future Prediction in Dynamic Scenes with Interacting Agents", IEEE International Conference on Computer Vision and Pattern Recognition (ICCVPR), 2017, pp. 2165-2174.
Liang et al., "Deep Continuous Fusion for Multi-Sensor 3D Object Detection", ECCV, 2018, 16 pages.
Liang et al., "PnPNet: End-to-End Perception and Prediction with Tracking in the Loop", IEEE International Conference on Computer Vision and Pattern Recognition (ICCVPR), 2020, pp. 11550-11559.
Lin et al., "Focal Loss for Dense Object Detection", IEEE International Conference on Computer Vision (ICCV), 2017, pp. 2980-2988.
Lombacher et al., "Semantic Radar Grids", IEEE Intelligent Vehicles Symposium (IV), 2017, Redondo Beach, California, pp. 1170-1175.
Luo et al., "Fast and Furious: Real Time End-to-End 3D Detection, Tracking and Motion Forecasting with a Single Convolutional Net", IEEE International Conference on Computer Vision and Pattern Recognition (ICCVPR), 2018, pp. 3569-3577.
Major et al., "Vehicle Detection with Automotive Radar using Deep Learning on Range-Azimuth-Doppler Tensors", IEEE International Conference on Computer Vision Workshop (ICCVW), 2019, pp. 924-932.
Meyer et al., "Deep Learning Based 3D Object Detection for Automotive Radar and Camera", 16th European Radar Conference (EuRAD), 2019, Paris, France, pp. 133-136.
Meyer et al., "LaserNet: An Efficient Probabilistic 3D Object Detector for Autonomous Driving", IEEE International Conference on Computer Vision and Pattern Recognition (ICCVPR), 2019, pp. 12669-12678.
Meyer et al., "Sensor Fusion for Joint 3D Object Detection and Semantic Segmentation", IEEE International Conference on Computer Vision and Pattern Recognition Workshops (ICCVPRW), 2019, pp. 1230-1237.
Nobis et al., "A Deep Learning-Based Radar and Camera Sensor Fusion Architecture for Object Detection", 2020, 7 pages.
NVIDIA Developer, "CUDA Toolkit", Oct. 2, 2020, https://developer.nvidia.com/cuda-toolkit, retrieved on Sep. 28, 2021, 9 pages.
NVIDIA Developer, "NVIDIA TensorRT", Jul. 1, 2020, https://developer.nvidia.com/tensorrt, retrieved on Sep. 28, 2021, 7 pages.
Phan-Minh et al., "CoverNet: Multimodal Behavior Prediction using Trajectory Sets", IEEE International Conference on Computer Vision and Pattern Recognition (ICCVPR), 2020, pp. 14062-14071.
Rhinehart et al., "PRECOG: PREdiction Conditioned on Goals in Visual Multi-Agent Settings", IEEE International Conference on Computer Vision (ICCV), 2019, pp. 2821-2830.
Richards et al., "Principles of Modern Radar", SciTech Publishing, Edison, New Jersey, 2010, 962 pages.
Shi et al., "PointRCNN: 3D Object Proposal Generation and Detection from Point Cloud", IEEE International Conference on Computer Vision and Pattern Recognition (ICCVPR), 2019, pp. 770-779.
Sless et al., "Road Scene Understanding by Occupancy Grid Learning from Sparse Radar Clusters using Semantic Segmentation", IEEE International Conference on Computer Vision Workshop (ICCVW), 2019, pp. 867-875.
Tang et al., "Multiple Futures Prediction", $33^{rd}$ Conference on Advances in Neural Information Processing Systems (NeurIPS), 2019, Vancouver, Canada, 11 pages.
Yang et al., "PIXOR: Real-Time 3D Object Detection from Point Clouds", IEEE International Conference on Computer Vision and Pattern Recognition (ICCVPR), 2018, pp. 7652-7660.
Yang et al., "RadarNet: Exploiting Radar for Robust Perception of Dynamic Objects", ECCV, 2020, 17 pages.
Yang et al., "STD: Sparse-to-Dense 3D Object Detector for Point Cloud", IEEE International Conference on Computer Vision (ICCV), 2019, pp. 1951-1960.
Zhang et al., "STINet: Spatio-Temporal-Interactive Network for Pedestrian Detection and Trajectory Prediction", IEEE International Conference on Computer Vision and Pattern Recognition (ICCVPR), 2020, pp. 11346-11355.
Zhao et al., "Multi-Agent Tensor Fusion for Contextual Trajectory Prediction:, IEEE International Conference on Computer Vision and Pattern Recognition (ICCVPR), 2019, pp. 12126-12134.
Zhou et al., "End-to-End Multi-View Fusion for 3D Object Detection in LiDAR Point Clouds", $3^{rd}$ Conference on Robot Learning (CoRL), 2019, Osaka, Japan, 10 pages.

* cited by examiner

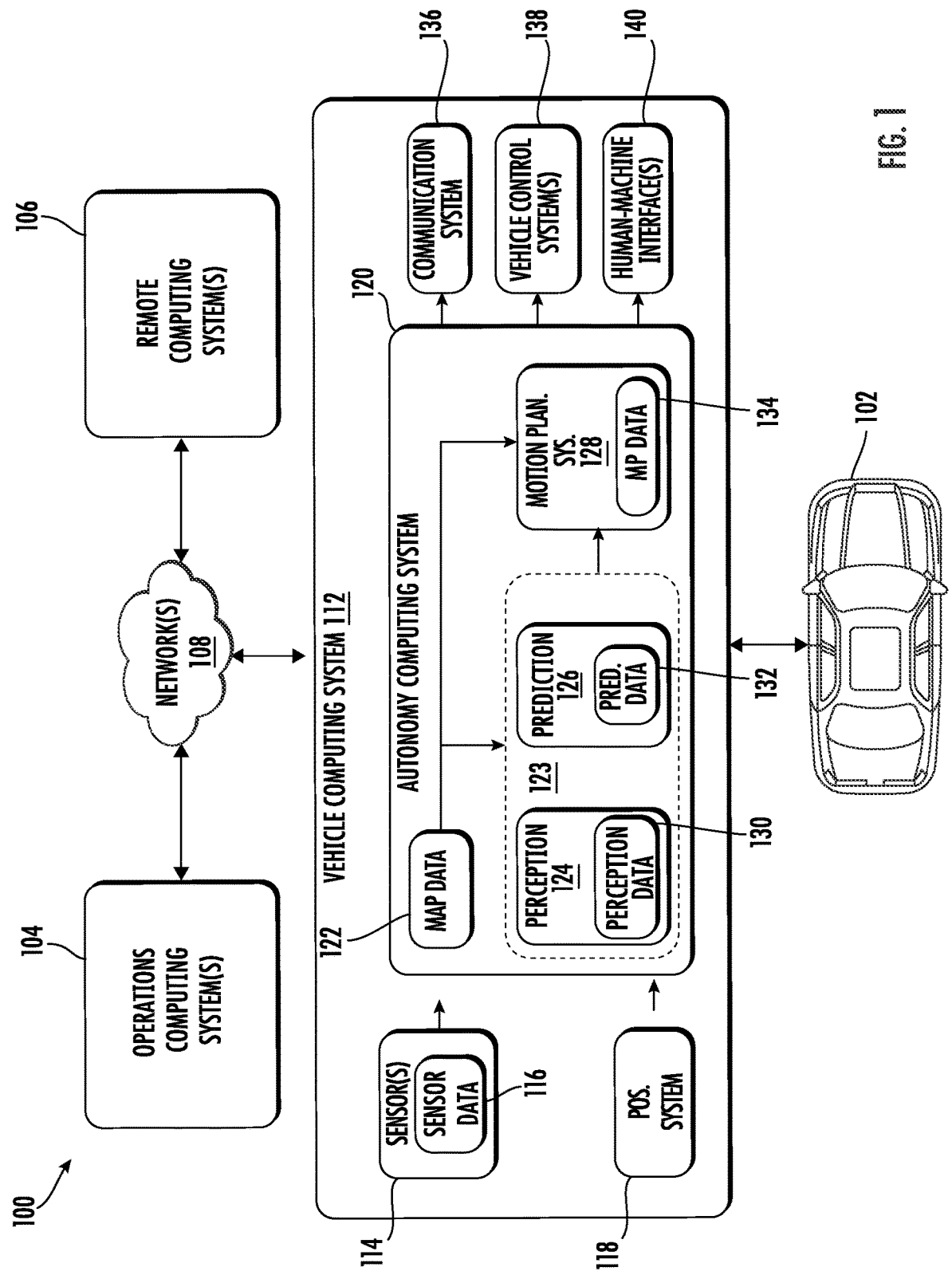

SYSTEMS AND METHODS FOR END-TO-END TRAJECTORY PREDICTION USING RADAR, LIDAR, AND MAPS

PRIORITY CLAIM

The present application claims filing benefit of U.S. Provisional Patent Application Ser. No. 63/057,632 having a filing date of Jul. 28, 2020 and U.S. Provisional Patent Application Ser. No. 63/107,907 having a filing date of Oct. 30, 2020, which are incorporated herein by reference in their entirety.

FIELD

The present disclosure relates generally to performing autonomous vehicle operations. In particular, the present disclosure relates to techniques for training and implementing network models which can perform early fusion of radar data, LIDAR data, and/or map data to both perceive and predict trajectories for objects in a surrounding environment.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given such knowledge, an autonomous vehicle can navigate through the environment.

SUMMARY

Aspects and advantages of embodiments of the present disclosure will be set forth in part in the following description, or may be learned from the description, or may be learned through practice of the embodiments.

One example aspect of the present disclosure is directed to a computing system. The computing system can include one or more processors and a memory comprising one or more tangible non-transitory computer-readable media. The media can include media storing computer-readable instructions that when executed by the one or more processors cause the one or more processors to perform operations. The operations can include obtaining, from one or more sensors of an autonomous vehicle, LIDAR data and radar data. The radar data can include one or more radar sweeps. The LIDAR data can include one or more LIDAR sweeps. The operations can further include inputting the LIDAR data and the radar data into a network model comprising one or more machine-learned models. The operations can further include generating, by the network model, one or more features for each of the LIDAR data and the radar data. The operations can further include combining, by the network model, the one or more generated features for each of the LIDAR data and the radar data to generate fused feature data. The operations can further include generating, by the network model, prediction data based at least in part on the fused feature data. The operations can further include receiving, as an output of the network model, the prediction data. The prediction data can include a respective predicted trajectory for a future time period for one or more detected objects. The one or more detected objects may optionally be received as an output of the network model.

Another example aspect of the present disclosure is directed to a computer-implemented method for training a trajectory prediction network model from end-to-end. The network model can include a plurality of subnetworks configured to extract one or more features from input data and a trajectory prediction machine-learned model. The method can include inputting training data into the network model. The training data can include radar data comprising a plurality of sweeps, LIDAR data comprising a plurality of sweeps, and map data. The method can further include generating, by the network model, one or more features for each of the LIDAR data, the radar data, and the map data. The method can further include combining, by the network model, the one or more generated features for each of the LIDAR data, the radar data, and the map data to generate fused feature data. The method can further include predicting, by the network model, a respective future trajectory for one or more objects detected by the network model. The method can further include determining a loss function for the network model based at least in part on a comparison between the respective predicted future trajectory for the one or more objects and a ground truth future trajectory. The method can further include training the network model based at least in part on the loss function.

Another example aspect of the present disclosure is directed to an autonomous vehicle. The autonomous vehicle can include one or more LIDAR sensors configured to obtain sweeps of LIDAR data, one or more radar sensors configured to obtain sweeps of radar data, and a computing system. The computing system can include one or more processors and a memory comprising one or more tangible non-transitory computer-readable media. The media can store computer-readable instructions that when executed by the one or more processors cause the one or more processors to perform operations. The operations can include obtaining, from the one or more LIDAR sensors, LIDAR data comprising one or more sweeps. The operations can further include obtaining, from the one or more radar sensors, radar data comprising one or more sweeps. The operations can further include obtaining map data associated with the LIDAR data and the radar data. The operations can further include inputting the LIDAR data, the radar data, and the map data into a network model comprising one or more machine-learned models. The operations can further include generating, by the network model, one or more features for each of the LIDAR data, the radar data, and the map data. The operations can further include combining, by the network model, the one or more generated features for each of the LIDAR data, the radar data, and the map data to generate fused feature data. The operations can further include generating, by the network model, prediction data based at least in part on the fused feature data. The operations can further include receiving, as an output of the network model, the prediction data. The prediction data can include a respective predicted trajectory for a future time period for one or more detected objects. The operations can further include determining a motion plan based at least in part on the respective predicted trajectory for the one or more detected objects. The operations can further include controlling the autonomous vehicle based at least in part on the motion plan.

Other example aspects of the present disclosure are directed to systems, methods, vehicles, apparatuses, tangible, non-transitory computer-readable media, and memory devices for operating autonomous vehicles.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 1 depicts a block diagram of an example system for an autonomous vehicle according to example embodiments of the present disclosure.

DETAILED DESCRIPTION

Figure 2A:
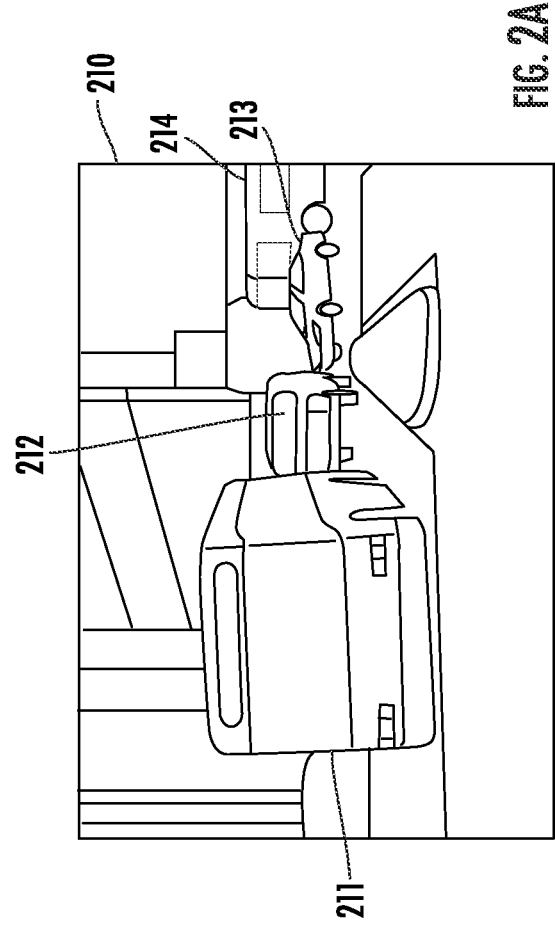
FIG. 2A depicts a diagram of an example geographic scene from the perspective of a vehicle according to example aspects of the present disclosure.

Example aspects of the present disclosure are directed to systems and methods for predicting trajectories using fused sensor data. More particularly, the systems and methods of the present disclosure provide improved techniques for training and implementing network models which can perform early fusion of radar data, LIDAR data, and/or map data to both perceive (e.g., detect) and predict trajectories for objects in a surrounding environment. For example, a computing system, such as a computing system on board an autonomous vehicle, can obtain sensor data (e.g., LIDAR data, radar data) from one or more sensors of the autonomous vehicle, and can input the raw sensor data into a network model (e.g., comprising one or more machine-learned models) to generate spatio-temporal features from the raw data. Further, the generated features can be fused and input into a trajectory prediction machine-learned model to obtain predicted trajectories for detected objects. The systems and methods of the present disclosure can provide significant improvements to both object detection and trajectory prediction, and can be trained from end-to-end using previously-acquired sensor data.

The following describes the technology of this disclosure within the context of autonomous vehicles for example purposes only. As described herein, the technology is not limited to an autonomous vehicle setting and can be implemented within other robotic and/or computing systems, such as those utilizing object detection and prediction machine-learned models.

An autonomous vehicle can include an onboard vehicle computing system with a variety of components for operating with minimal and/or no interaction from a human operator. For example, the computing system can be located onboard the autonomous vehicle and include one or more sensors (e.g., cameras, LIDAR, Radio Detection and Ranging (radar), etc.), an autonomy computing system (e.g., for determining autonomous navigation), one or more vehicle control systems (e.g., for controlling braking, steering, powertrain), etc. The vehicle computing system can access or otherwise obtain information about the surrounding environment, such as map data associated with sensor data acquired by the autonomous vehicle.

The vehicle computing system (e.g., the autonomy computing system) can include sub-systems that cooperate to perceive the surrounding environment of the autonomous vehicle and determine a motion plan for controlling the motion of the autonomous vehicle. For example, the vehicle computing system can include a joint perception and prediction system configured to perceive object(s) within the surrounding environment of the autonomous vehicle and to predict motion of the object(s) within the surrounding environment of the autonomous vehicle. In some implementations, the vehicle computing system can separate these perception and prediction functions into separate systems. The vehicle computing system can include a motion planning system configured to plan the motion of the autonomous vehicle with respect to the object(s) within the surrounding environment of the autonomous vehicle. The vehicle computing system can include and/or otherwise communicate with a vehicle control system, which can cause the autonomous vehicle to travel according to the motion plan.

According to example aspects of the present disclosure, in some implementations, the computing system can include a network model comprising one or more machine-learned models. For example, in some implementations, the network model can include one or more subnetworks configured to respectively preprocess various data inputs, such as sensor data and/or map data. For example, each of the subnetworks can be configured to process a particular data input (e.g., radar data, LIDAR data, map data) to generate (e.g., extract, learn) one or more features for the data. In some implementations, the network model can include a multi-scale fusion backbone. For example, the multi-scale fusion backbone can be configured to fuse the various features generated from the input data. In some implementations, the network model can include a prediction head configured to perceive (e.g., detect) objects and predict their associated trajectories. For example, the fused feature data can be input into the prediction head to generate the prediction data.

In some implementations, the computing system can obtain sensor data from one or more sensors of an autonomous vehicle. For example, various sensors can be positioned around and/or on a vehicle. For example, in some implementations, a LIDAR sensor can be positioned on top of a vehicle. In some implementations, a plurality of LIDAR sensors can be positioned around an exterior of the vehicle. In some implementations, one or more radar sensors can be positioned around a vehicle. The sensor(s) can be configured to obtain sensor data by performing one or more sweeps. For example, each sweep can obtain sensor data corresponding to a 360 degree field of view of the environment surrounding the vehicle. In some implementations, the sensors can obtain a plurality of sweeps over a period of time, such as, for example, 10 sweeps per second (e.g., 10 Hz).

The computing system can further be configured to obtain map data associated with the sensor data (e.g., LIDAR data, radar data). For example, the map data can correspond to the geographic area in which the sensor data was obtained. In some implementations, the map data (or a portion thereof) can be stored locally (e.g., on board the autonomous vehicle). In some implementations, the map data (or a portion thereof) can be obtained from a remote computing system, such as over a communication network.

The computing system can be configured to input LIDAR data, radar data, and/or map data into the network model. For example, in some implementations, each of the LIDAR data, radar data, and map data can be input into separate subnetworks of the network model. Each subnetwork can be configured to generate one or more features for the input data.

For example, a radar data subnetwork can receive a sequence of radar sweeps as an input. The radar subnetwork can be configured to transform all radar points in the sequence of radar sweeps into a coordinate frame associated with the most recent sweep. For example, transforming the radar points into a common coordinate frame can allow for the radar sweeps to have a consistently relative frame of view (e.g., from the perspective of the reference vehicle). The coordinate frame can include, for example, a plurality of cells, wherein each cell is a unique position within the coordinate frame.

In some implementations, the coordinate frame can be a two-dimensional coordinate frame. For example, the coordinate frame can be a top-down grid comprising a Cartesian grid (e.g., x, y coordinates). In some implementations, the coordinate frame can be top-down arc grid (e.g., range, $\theta$). In some implementations, the coordinate frame can be a three-dimensional grid, such as a voxel grid (e.g., x, y, z coordinates).

The radar data subnetwork can further be configured to generate (e.g., extract, learn) features for the input radar data. For example, for each radar point i in a sweep m, a feature vector $f_i^m$ containing a position (e.g., 2D position $(x_i^m, y_i^m)$), radar cross-section $(e_i^m)$, and ego-motion compensated radial velocity (expressed as a vector in the coordinate frame $(v_{x,i}^m, v_{y,i}^m)$) can be calculated.

In some implementations, the radar data subnetwork can learn spatial features and temporal features. For example, the spatial features can be learned on individual sweeps to provide robustness to sparsity and position errors observed in radar points. The temporal features can be learned on a plurality (e.g., sequence) of sweeps to learn other features (e.g., velocity) of objects.

For example, in some implementations, the radar data subnetwork can include one or more parametric continuous convolutions to generate cell features. Using parametric continuous convolutions can allow for different input and output domains. To generate (e.g., extract, learn) features for a particular sweep for spatial features, the input domain can include individual radar points and the output domain can include coordinate frame cells. In some implementations, for each cell j, the features $h_j^m$ for the sweep m can be generated using the following:

$$h_j^m = \Sigma_{i \in A_j^m} g^m(f_i^m \otimes (x_i^m - x_j^m)),$$

where $A_j^m$ is the set of associated radar points, $x_i^m$ is the coordinates of the associated radar point (e.g., two-dimensional coordinates), $x_j^m$ is the coordinate of cell's center (e.g., two-dimensional coordinates), $\otimes$ denotes the concatenation operation, $f_i^m$ is the feature vector for the radar point, and $g^m(\ )$ is a multi-layer perceptron with learnable weights shared across all cells. In some implementations, $A_j^m$ can be determined using a nearest neighbor algorithm with a distance threshold. This can allow for positional errors in the radar to be compensated for, since the threshold area can be larger than an individual cell.

In some implementations, the temporal features for a radar subnetwork can be generated by combining the spatial features for a plurality of sweeps. For example, for each cell j, a spatio-temporal feature vector $h^j$ can be determined by concatenating the per sweep features $h_j^m$ and using a multi-layer perceptron to combine them.

In some implementations, a LIDAR data subnetwork can be configured to generate (e.g., extract, learn) features from the input LIDAR data. For example, the computing system can input a sequence of L past LIDAR sweeps. For LIDAR points in each sweep, the points can be discretized to create an occupancy grid. For example, in a two-dimensional top-down cartesian grid, LIDAR points can be discretized using x and y dimensions. Further, a z dimension can be discretized to create a multi-channel binary occupancy feature for each cell in a coordinate frame. The temporal, per-sweep occupancy features can then be concatenated and used as an input to a lightweight network for generate (e.g., learn, extract) spatio-temporal LIDAR features for cells in the coordinate frame.

In some implementations, a map subnetwork can be configured to generate (e.g., extract, learn) features from input map data. For example, in some implementations, the map data can be high-definition (HD) image data. The image data can be rasterized to generate a coordinate frame with various information, such as lane locations, etc.

Each of the subnetworks can thus respectively generate features which can then be combined to generate fused feature data. For example, a computing system can receive the respective one or more features from each of the subnetworks and can input the one or more features into a multi-scale fusion backbone. For example, in some implementations, the multi-scale fusion backbone can include a plurality of convolutional layers which can concatenate the features at different scales. For example, in some implementations, the multi-scale fusion backbone can include one or more inception blocks with a plurality of branches with different down-sampling ratios (e.g., 1×, 2×, 4×). In some implementations, three sequential inception blocks can be used with a feature pyramid network to compute features for each coordinate frame cell. The features from all modalities at multiple scales can be concatenated and provided as an input to the first inception block. The fused feature data can be received as an output of the final inception block.

The computing system can then generate prediction data using the network model based at least in part on the fused feature data. For example, in some implementations, the fused feature data received as an output from a multi-scale fusion backbone can be input into a prediction head. The prediction head can include one or more convolutional layers with learnable weights. In some implementations, the output fused features can be passed through a full convolutional single shot detector, which can detect objects. Each detected object can then be passed through the prediction head (e.g., a convolutional neural network) to generate trajectory predictions. The prediction data can be received as an output of the network model.

In some implementations, the generated predictions (e.g., prediction data) can include probabilistic multi-hypothesis trajectory predictions for each detected object. For example, a plurality of possible trajectories with associated probabilities can be predicted by the network model.

In some implementations, the generated prediction data can be provided to a motion planning system, such as a motion planning system of a vehicle autonomy system. For example, the combined perception and prediction systems described herein can generate detected object and associated trajectory data, which can be provided to a motion planning system of a vehicle autonomy system. The motion planning system can then determine a motion plan to navigate through the surrounding environment using the perception and prediction data.

In some implementations, a vehicle control system, such as a vehicle control system including a plurality of subsystems (e.g., acceleration system, turning system, braking system) can implement the motion plan to cause the vehicle to travel according to the motion plan. For example, various control signals can be generated by the control system and communicated to various vehicle systems to cause the vehicle to travel according to the motion plan.

According to additional aspects of the present disclosure, the network models of the present disclosure can be trained from end-to-end. For example, in some implementations, the network model can be trained from end-to-end using a multi-task loss defined as a weighted sum of a detection loss and a trajectory loss: $\mathcal{L}_{total} = \mathcal{L}_{det} + \mathcal{L}_{traj}$.

For example, the detection loss ($\mathcal{L}_{det}$) can be a multi-task loss comprising a weighted sum of a classification and regression loss: $\mathcal{L}_{det} = \mathcal{L}_{det}^{cls} + \alpha \mathcal{L}_{det}^{reg}$. The classification loss can be trained using a focal loss for each coordinate frame cell for being at the center of a particular object class. In some implementations, each object i can be parameterized by its center $(x_i, y_i)$, orientation $(\Theta_i)$, and size $(w_i, h_i)$. In some implementations, smooth L1 loss can be used to train regression parameters of each object.

In some implementations, the trajectory data can be a single-hypothesis trajectory, while in others, it can be a multi-hypothesis trajectory. The trajectory loss $\mathcal{L}_{traj}$ can be determined by considering each waypoint at time t of a trajectory j to be a Laplace distribution (e.g., 2D) parameterized by its position $(x_j^t, y_j^t)$ and scale $(\sigma_{j,x}^t, \sigma_{j,y}^t)$. A sum of KL divergence between a ground truth and predicted distribution of all waypoints can be used as a regression loss. For single hypothesis predictions, the prediction loss may contain only a single component: $\mathcal{L}_{traj} = \mathcal{L}_{traj}^{reg}$. For multiple hypothesis predictions, the prediction loss may contain regression and classification losses: $\mathcal{L}_{traj} = \mathcal{L}_{traj}^{reg} + \mathcal{L}_{traj}^{cls}$. In some implementations, a cross-entropy loss can be used for learning the confidence of each predicted hypothesis.

The training data can include, for example, data previously acquired during one or more autonomous vehicle driving sessions. For example, sensor data comprising LIDAR data and radar data can be obtained during an autonomous driving session. The acquired data can be associated with map data. The LIDAR data, radar data, and map data can be input into the network model, and a predicted trajectory for detected objects can be compared to a ground truth detection and trajectory prediction, which can be derived from the previously-acquired data for a future time period. For example, a trajectory prediction for an object 3 seconds into the future can be compared to an actual trajectory for the detected object derived from the sensor data. In this way, the network models according to example aspects of the present disclosure can be trained from end-to-end to both perceive and predicted trajectories for detected objects using raw sensor input data, including radar data.

The systems and methods of the present disclosure can provide a number of technical effects and benefits. For example, by incorporating radar sensor information along with LIDAR and map information, more accurate trajectory prediction and object detection can be performed. This can improve the ability of an autonomous vehicle to both perceive objects within its environment, while accounting for the likely trajectories of those objects. For example, objects can be detected further out, and instantaneous radial velocity measurements can be obtained. Further, the systems and methods of the present disclosure can overcome radar data fusion challenges, such as the relatively low angular resolution of radar measurements, sparsity of radar measurements, and a lack of synchronization with other data sources, such as LIDAR data.

Moreover, the systems and methods of the present disclosure can allow for end-to-end training using actual real world data. This can allow for more efficient training of the network model to be performed by removing the need for any human tuning of the model. Further, the systems and methods of the present disclosure can allow lower-latency object detection and trajectory prediction to be performed using raw sensor data, which can allow for autonomous vehicles to respond more quickly to objects in the vehicle's environment. This, in turn, can increase the safety of autonomous vehicle operation.

Various means can be configured to perform the methods and processes described herein. For example, a computing system can include data obtaining unit(s), data input unit(s), feature generation unit(s), feature fusion unit(s), object detection unit(s), trajectory prediction unit(s), motion planning unit(s), control unit(s), training unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., data acquisition unit(s), etc.) can be configured to obtain sensor data (e.g., LIDAR data, radar data) from one or more sensors of an autonomous vehicle. The means (e.g., data acquisition unit(s), etc.) can be configured to obtain map data, such as map data stored locally and/or map data communicated from a remote computing system. The means (e.g., data input unit(s), etc.) can be configured to input the data (e.g., LIDAR data, radar data, map data) into a network model. For example, the means (e.g., data input unit(s), etc.) can be configured to input the data into respective subnetwork of a network model for each data source.

The means (e.g., feature generation unit(s), etc.) can be configured to generate features for each of the input data. For example, the respective subnetwork can be configured to generate (e.g., learn, extract) features for each respective source. In some implementations, the means (e.g., feature generation unit(s), etc.) can be configured to perform various operations such as transforming data, determining feature vectors, concatenating features, rasterising features, discretizing features, and/or performing other feature generation processes as described herein.

The means (e.g., feature fusion unit(s), etc.) can be configured to fuse generated features. For example, the means (e.g., feature fusion unit(s), etc.) can be configured to input the generated features received from each respective subnetwork into a multi-scale fusion backbone. The means (e.g., feature fusion unit(s), etc.) can be configured to perform various operations such as concatenating, scaling, and/or performing other feature fusion processes as described herein.

The means (e.g., object detection unit(s), etc.) can be configured to detect objects. For example, the means (e.g., object detection unit(s), etc.) can be configured to pass the fused feature data through a single stage convolutional header to detect objects. The means (e.g., trajectory prediction unit(s), etc.) can be configured to predict trajectories for detected objects. For example, the means (e.g., trajectory prediction unit(s), etc.) can be configured to perform single hypothesis and/or multiple hypothesis trajectory prediction for the detected objects. The means (e.g., motion planning unit(s), etc.) can be configured to generate a motion plan for the recipient autonomous vehicle based at least in part on the autonomy output. The means (e.g., control unit(s), etc.) can be configured to initiate a motion control of the recipient autonomous vehicle based at least in part on the motion plan.

The means (e.g., training unit(s), etc.) can be configured to train a network model. For example, the means (e.g., training unit(s), etc.) can be configured to train a network model from end-to-end using a loss function including a detection loss and a trajectory loss.

With reference to the figures, example embodiments of the present disclosure will be discussed in further detail.

FIG. 1 depicts a block diagram of an example system 100 for an autonomous vehicle according to example embodiments of the present disclosure. As illustrated, FIG. 1 shows a system 100 that can include a vehicle 102; an operations computing system 104; one or more remote computing devices 106; communication network(s) 108; a vehicle computing system 112; one or more sensors 114; sensor data 116; a positioning system 118; an autonomy computing system 120; map data 122; a perception system 124; a prediction system 126; a motion planning system 128; perception data 130; prediction data 132; motion plan data 134; a communication system 136; a vehicle control system 138; and a human-machine interface 140. The vehicle 102 can be an autonomous vehicle.

The operations computing system 104 can be associated with a service entity that can provide one or more vehicle services to a plurality of users via a fleet of vehicles that includes, for example, the vehicle 102. The vehicle services can include transportation services (e.g., human transport ridesharing, ride-hailing services), courier services (e.g., item transport from a requested origin to destination), delivery services (e.g., item transport to a requested destination), and/or other types of services. The operations computing system 104 can be remote from the vehicle 102.

The operations computing system 104 can include multiple components for performing various operations and functions. For example, the operations computing system 104 can include and/or otherwise be associated with the one or more computing devices that are remote from the vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with the service entity, the operation of one or more vehicles (e.g., a fleet of vehicles), with supporting the provision of vehicle services, and/or other operations as discussed herein.

For example, the operations computing system 104 can be configured to monitor and communicate with the vehicle 102 and/or its users to coordinate a vehicle service provided by the vehicle 102. To do so, the operations computing system 104 can manage a database that includes data including vehicle status data associated with the status of vehicles including the vehicle 102. The vehicle status data can include a state of a vehicle, a location of a vehicle (e.g., a latitude and longitude of a vehicle), the availability of a vehicle (e.g., whether a vehicle is available to pick-up or drop-off passengers and/or items, etc.), and/or the state of objects internal and/or external to a vehicle (e.g., the physical dimensions and/or appearance of objects internal/external to the vehicle).

The operations computing system 104 can communicate with the one or more remote computing devices 106 and/or the vehicle 102 via one or more communications networks including the communications network(s) 108. The communications network(s) 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 102 including exchanging (e.g., sending and/or receiving) data or signals with the vehicle 102, monitoring the state of the vehicle 102, and/or controlling the vehicle 102. The one or more remote computing devices 106 can communicate (e.g., exchange data and/or signals) with one or more devices including the operations computing system 104 and the vehicle 102 via the communications network 108. In some implementations, the one or more remote computing devices 106 can be associated with a third party such as, for example, a third-party vehicle vendor/manager with a fleet of third-party vehicles. The remote computing devices 106 can implement the computing system of the third party (e.g., for communication, coordination, operation, etc. of third-party autonomous vehicles).

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to communicate data to and/or obtain data from a vehicle, and determine and/or modify one or more states of the vehicle 102 including a location (e.g., a latitude and longitude), a velocity, acceleration, a trajectory, and/or a path of the vehicle 102 based in part on signals or data exchanged with the vehicle 102. In some implementations, the operations computing system 104 can include the one or more remote computing devices 106.

The vehicle 102 can be a ground-based vehicle (e.g., an automobile, light electric vehicle, bicycle, scooter, etc.), an aircraft, and/or another type of vehicle (e.g., watercraft, etc.). The vehicle 102 can be an autonomous vehicle that can perform various actions including driving, navigating, flying, and/or operating, with minimal and/or no interaction from a human operator (local and/or remote). The autonomous vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the vehicle 102. Additionally, or alternatively, the vehicle 102 can provide data indicative of the state of the vehicle, the state of one or more passengers of the vehicle, and/or the state of an environment to the operations computing system 104, which can store an indication, record, and/or other data indicative of the state of the one or more objects (e.g., within a predefined distance of the vehicle 102) in one or more memory devices associated with the operations computing system 104 (e.g., remote from the vehicle). Furthermore, the vehicle 102 can provide data indicative of the state of the one or more objects (e.g., physical dimensions and/or appearance of the one or more objects) within a predefined distance of the vehicle 102 to the operations computing system 104, which can store an indication, record, and/or other data indicative of the state of the one or more objects within a predefined distance of the vehicle 102 in one or more memory devices associated with the operations computing system 104 (e.g., remote from the vehicle).

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. The one or more computing devices of the vehicle computing system 112 can include various components for performing various operations and functions. For instance, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the vehicle 102 (e.g., its computing system, one or more processors, and other devices in the vehicle 102) to perform operations and functions, including those of the vehicle described herein.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects that are proximate to the vehicle 102 (e.g., within range or a field of view of one or more of the one or more sensors 114). The one or more sensors 114 can include a Light Detection and Ranging (LIDAR) system, a Radio Detection and Ranging (RADAR) system, one or more cameras (e.g., visible spectrum cameras and/or infrared cameras), audio sensors (e.g., microphones, etc.), heat sensors, motion sensors, and/or other types of imaging capture devices and/or sensors. The sensor data 116 can include image data, radar data, LIDAR data, and/or other data acquired by the one or more autonomy system sensors 114. The one or more objects can include, for example, pedestrians, vehicles, bicycles, and/or other objects. The one or more sensors can be located on various parts of the vehicle 102 including a front side, rear side, left side, right side, top, or bottom of the vehicle 102. The sensor data 116 can be indicative of locations associated with the one or more objects within the surrounding environment of the vehicle 102 at one or more times. For example, the sensor data 116 can be indicative of one or more LIDAR point clouds associated with the one or more objects within the surrounding environment. The one or more sensors 114 can provide the sensor data 116 to the autonomy computing system 120. The sensor data 116 can include, for example sensor data 116 for one or more sweeps (e.g., LIDAR sweeps, RADAR sweeps, etc.).

In addition to the sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto. In some implementations, the map data 122 can include high definition (HD) map data. In some implementations, the map data 122 can include sparse map data indicative of a limited number of environmental features (e.g., lane boundaries, etc.). In some implementations, the map data can be limited to geographic area(s) and/or operating domains in which the vehicle 102 (or autonomous vehicles generally) may travel (e.g., due to legal/regulatory constraints, autonomy capabilities, and/or other factors). The map data 122 can be associated with other data, such as sensor data 116.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing device(s) 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the autonomy sensor data 116 (e.g., LIDAR data, camera data) to match it to a map of the surrounding environment to get an understanding of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. The perception system 124, prediction system 126, and/or motion planning system 128 can be separate systems or included within the same system. For example, the perception system 124 and the prediction system 126 can be included in a joint perception/prediction system 123. The joint perception/prediction system 123 can be configured to perform the functions of the perception system 124 and the prediction system 126 systems in a coordinated manner for improved speed, efficiency, and on-board computational resource cost. The joint perception/prediction system 123 can utilize one or more joint perception/prediction system models for performing such functions, as further described herein. For example, in some implementations, the joint perception/prediction system 123 can utilize a combination of LIDAR data, radar data, and/or map data to jointly detect one or more objects within the surrounding environment of the vehicle 102 and predict trajectories associated with the one or more detected objects. Example joint perception/prediction systems 123 and/or functions thereof according to example aspects of the present disclosure are discussed in greater detail with respect to FIGS. 2-4.

The autonomy computing system 120 can receive the sensor data 116 from the one or more autonomy system sensors 114, attempt to determine the state of the surrounding environment by performing various processing techniques on the autonomy sensor data 116 (and/or other data), and generate an appropriate motion plan through the surrounding environment. The autonomy computing system 120 can control the one or more vehicle control systems 138 to operate the vehicle 102 according to the motion plan.

The joint perception/prediction system 123 (e.g., a branch/portion associated with the functions of a perception system 124) can identify one or more objects that are proximate to the vehicle 102 based on sensor data 116 received from the sensors 114. In particular, in some implementations, the joint perception/prediction system 123 can determine, for each object, perception data 130 that describes a current state of such object. As examples, the perception data 130 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the joint perception/prediction system 123 can determine perception data 130 for each object over a number of iterations. In particular, the joint perception/prediction system 123 can update the perception data 130 for each object at each iteration. Thus, the joint perception/prediction system 123 can detect and track objects (e.g., vehicles, bicycles, pedestrians, etc.) that are proximate to the vehicle 102 over time, and thereby produce a representation of the environment around an vehicle 102 along with its state (e.g., a presentation of the objects of interest within a scene at the current time along with the states of the objects).

The joint perception/prediction system 123 (e.g., a branch/portion associated with the functions of a prediction system 126) can utilize the perception data 130 from the perception system 124 and predict one or more future locations and/or moving paths for each object based on such state data. For example, the prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory made of waypoints) of at least one object within the surrounding environment of the vehicle 102. For example, the predicted path (e.g., trajectory) can indicate a path along which the respective object is predicted to travel over time (and/or the velocity at which the object is predicted to travel along the predicted path). As further described herein, an autonomy output of the joint perception/prediction system 123 can include aspects of the perception data 130 (e.g., object state information, bounding shapes, etc.) and/or aspects of the prediction data 132 (e.g., predicted future location(s)/waypoint(s), predicted trajectories, etc.). The joint perception/prediction system 123 can provide the autonomy output, perception data 130, and/or prediction data 132 associated with the one or more objects to the motion planning system 128.

The motion planning system 128 can determine a motion plan and generate motion plan data 134 for the vehicle 102 based at least in part on the autonomy output, perception data 130, and/or prediction data 132 (and/or other data). The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion planning system 128 can plan the motion of the vehicle 102 based at least in part on an object (and its associated data) whether or not that object ultimately impacts the selected trajectory for the vehicle 102. For example, the motion planning system 128 can consider all objects and some objects may outweigh others due to proximity, type, urgency, and/or other factors (e.g., weather, failure events, etc.). The motion plan data 134 can include a planned trajectory, velocity, acceleration, and/or other actions of the vehicle 102.

As one example, in some implementations, the motion planning system 128 can determine an objective function (e.g., cost function, reward function, etc.) for each of one or more candidate motion plans for the autonomous vehicle 102 based at least in part on the current locations and/or predicted future locations and/or moving paths of the objects. For example, a cost function can describe a cost (e.g., over time) of adhering to a particular candidate motion plan. For example, the cost described by a cost function can increase when the autonomous vehicle 102 approaches impact with another object and/or deviates from a preferred pathway (e.g., a predetermined travel route).

Thus, given information about the current locations and/or predicted future locations and/or moving paths of objects, the motion planning system 128 can determine a cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle controller that controls one or more vehicle controls (e.g., actuators or other devices that control gas flow, steering, braking, etc.) to execute the selected motion plan.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a vehicle interface module configured to translate the motion plan data 134 into instructions. By way of example, the vehicle interface module can translate a determined motion plan data 134 into instructions for controlling the vehicle 102 including adjusting the steering of the vehicle 102 "X" degrees and/or applying a certain magnitude of braking force. The vehicle interface module can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections, etc.). In some implementations, the communications system 136 can allow communication among one or more of the system on-board the vehicle 102. The communications system 136 can also be configured to enable the vehicle 102 to communicate with and/or provide and/or receive data and/or signals from a remote computing device 106 associated with a user and/or an item (e.g., an item to be picked-up for a courier service). The vehicle 102 can also utilize the communications system 136 to communicate with another vehicle, infrastructure element, and/or other system (e.g., within the vehicle's geographic area, ecosystem, network, communication range, etc.).

The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop, and/or smartphone) can be viewable by a user of the vehicle 102 that is located in the front of the vehicle 102 (e.g., driver's seat, front passenger seat). Additionally, or alternatively, a display device can be viewable by a user of the vehicle 102 that is located in the rear of the vehicle 102 (e.g., a back passenger seat).

Referring now to FIG. 2A, an example geographic scene 210 according to example aspects of the present disclosure is depicted. For example, the example geographic scene 210 can represent a surrounding environment from the perspective of a vehicle, such as an autonomous vehicle. As shown, a plurality of vehicles 211-214 are making a left turn while approaching the reference vehicle (not shown). As the vehicles 211-214 turn, one or more sensors of the reference vehicle can obtain sensor data for one or more sweeps, such as LIDAR data and radar data. The LIDAR data can be, for example, a point cloud, while the radar data can be reflected radio waves, such as detected peaks using a Constant False Alarm Rate (CFAR) algorithm.

Figure 2B:
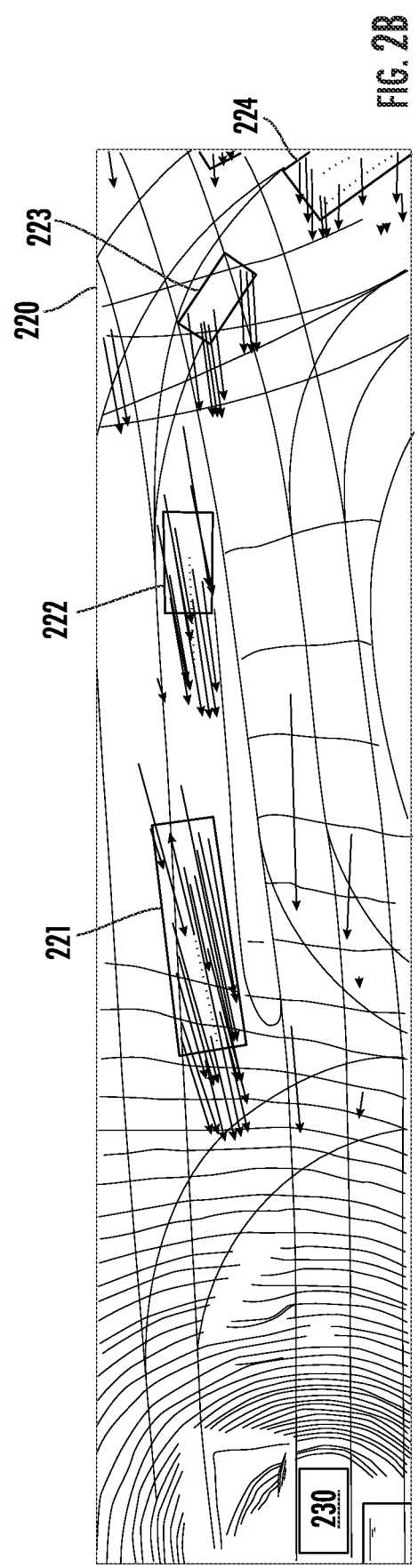
FIG. 2B depicts an example coordinate frame according to example aspects of the present disclosure.

Referring now to FIG. 2B, an example coordinate frame 220 corresponding to the example geographic scene 210 is depicted. The example coordinate frame 220 can be used by a vehicle autonomy system, such as a joint perception/prediction system 123 to jointly detect objects and predict trajectories associated with the detected objects.

For example, a computing system (e.g., a vehicle computing system) can obtain sensor data from one or more sensors of an autonomous vehicle. The sensors can include LIDAR sensors and/or radar sensors, and the sensor data can be sensor data acquired over one or more sweeps (e.g., sensor data indicative of an environment within a 360 field of view around the vehicle), as described herein. For example, the sensor(s) can be positioned on/around the vehicle to obtain the sensor data. In some implementations, a single sensor can be configured to obtain a sweep (e.g., a spinning LIDAR sensor positioned on top of a vehicle). In some implementations, a plurality of sensors can be configured to obtain a sweep (e.g., a plurality of RADAR sensors positioned at the four corners of a vehicle).

In some situations, however, the sensor data from different sensors may not precisely align. For example, the time period (e.g., frequency) for a radar sweep may not be the same as the time period for a LIDAR sweep. Additionally, the starting time for sweeps may not be the same for LIDAR and radar sensors. Further, in a typical application, data from a radar sensor may contain fewer points relative to LIDAR (e.g., 2-3 orders of magnitude fewer) and/or have angular accuracies lower relative to LIDAR (e.g., 1-2 orders of magnitude less precise).

The systems and methods of the present disclosure, however, can allow for early fusion of data from sensors (e.g., LIDAR, radar), as well as map data (e.g., HD maps) by transforming the sensor data into a coordinate frame 220. For example, as shown in FIG. 2B, in some implementations, the coordinate frame 220 can be a two-dimensional top-down grid comprising a plurality of cells, such as a Birds Eye View (BEV) grid. In some implementations, the coordinate frame 220 can be a cartesian grid (e.g., an x, y grid) wherein each cell can be described by a pair of coordinates. In some implementations, the coordinate frame 220 can be an arc grid described by a distance and angle (e.g., range, θ). In some implementations, the coordinate frame 220 can be a three-dimensional grid, such as a voxel grid (e.g., x, y, z coordinates). Other types of coordinate frames can similarly be used.

A computing system (e.g., a vehicle computing system) can obtain one or more radar sweeps (e.g., measurements over a 360 degree field of view) from one or more radar sensors in a time interval. In some implementations, the computing system can obtain a sequence of radar sweeps M In some implementations, each of the radar points in a sweep can be transformed into a coordinate frame 220 associated with a most recent sweep. For example, as shown in the coordinate frame 220, a plurality of radar points from a sequence of sweeps have been graphically represented as arrows and plotted in the coordinate frame 220. For example, for each sweep in the sequence of sweeps M, each of the vehicles 211-214 may have one or more corresponding radar points indicative of the respective vehicle 211-214. The radar points in the sequence of sweeps can be transformed by, for example, adjusting a relative position of the radar points to account for a time delay as well as positional variations attributed to movement of either the vehicles 221-224 and/or the perspective vehicle 230.

In some implementations, one or more machine-learned models, such as a subnetwork of a network model, can be trained to transform the radar points into the coordinate frame 220. In some implementations, one or more pre-processing algorithms can be used to perform the radar data transformation.

Figure 3:
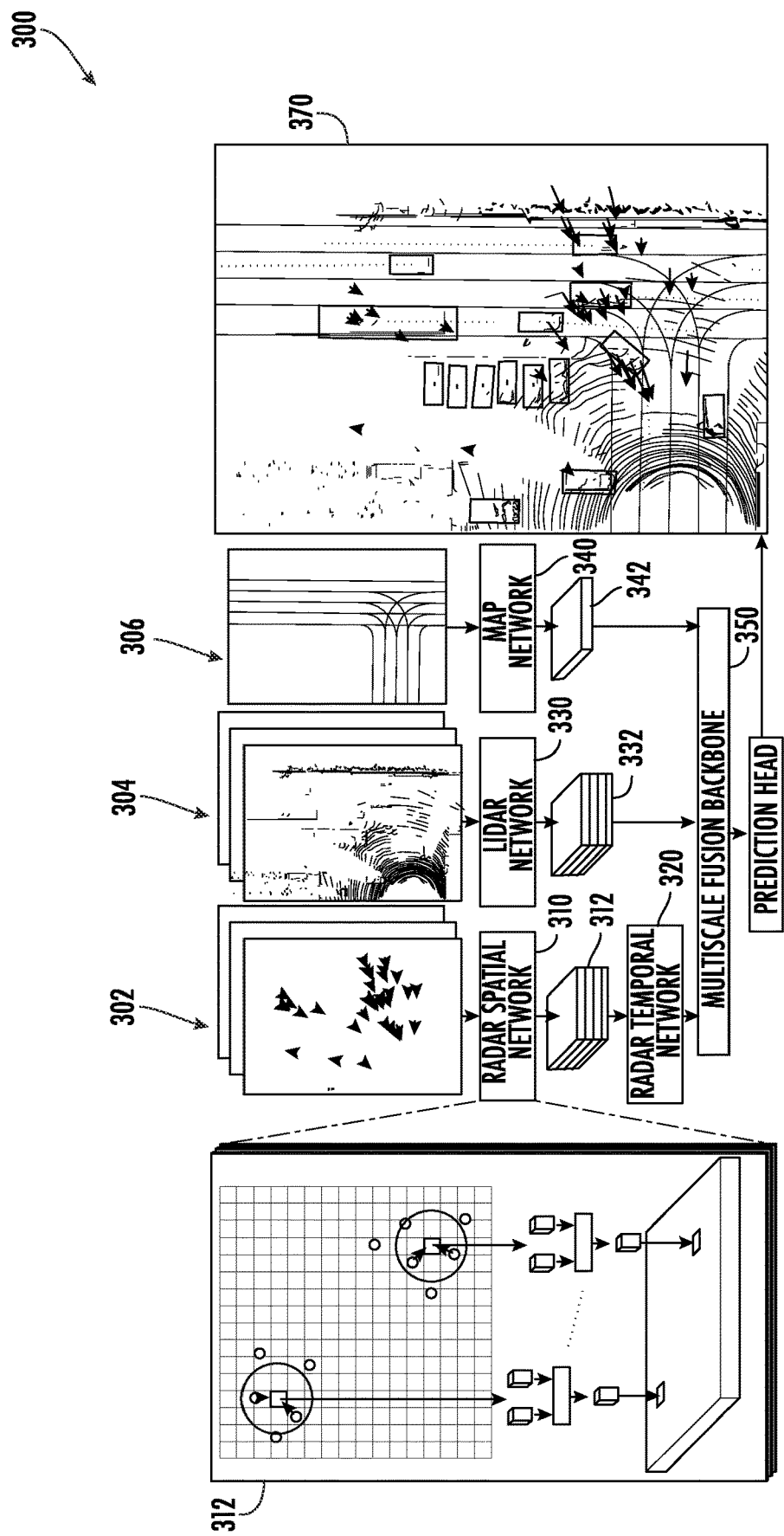
FIG. 3 depicts a diagram of an example network model architecture according to example aspects of the present disclosure.

For example, referring now to FIG. 3, an example network model 300 according to example aspects of the present disclosure is depicted. As shown, the network model 300 can include a plurality of subnetworks to process various data inputs. For example, a computing system can obtain radar data 302, LIDAR data 304, and map data 306. The radar data 302 and LIDAR data 304 can include, for example, one or more sweeps, as described herein.

The radar data 302 can be input into a radar subnetwork which includes a radar spatial network 310 and a radar temporal network 320. The radar spatial network 310 and radar temporal network 320 can extract spatio-temporal features from raw radar points. For example, as depicted at 312, the raw radar data 302 has been input into the radar spatial network 310 and transformed into a coordinate frame for the most recent radar sweep. In some implementations, the coordinate frame can be centered at the ego-vehicle position (e.g., the reference vehicle's position).

The radar subnetwork (e.g., the radar spatial network 310 and radar temporal network 320) can calculate a feature vector $f_i^m$ containing a position (e.g., 2D position ($x_i^m$, $y_i^m$)), radar cross-section ($e_i^m$), and ego-motion compensated radial velocity (expressed as a vector in the coordinate frame ($v_{x,i}^m$, $v_{y,i}^m$)) for each radar point i in a sweep m. For example, the radar spatial network can extract features for each cell in the coordinate frame using a single sweep of radar points. Generally, radar is sparser and has higher positional noise than LIDAR, so discretizing the radar (e.g., into x, y coordinates) at the same resolution as LIDAR may not work well for feature extraction.

To overcome this, the example radar spatial network 310 according to example aspects of the present disclosure can use a different resolution for feature learning. For example, the resolution can be lower than the resolution for the LIDAR subnetwork 330. In some implementations, a parametric continuous convolution learnable operator can be used to extract features at the lower resolution. Using the parametric continuous convolution learnable operator can generalize the standard convolution operator to a non-grid like structure, thereby allowing for different input and output domains with pre-defined correspondence between them. To generate (e.g., extract, learn) spatial features 312 for a particular sweep, the input domain can include individual radar points (e.g., raw radar data 302) and the output domain can include coordinate frame cells (e.g., x, y BEV grid cells).

In some implementations, for each cell j, the spatial features 312 (denoted as $h_j^m$) for the sweep m of radar data 302 can be generated using the following:

$$h_j^m = \Sigma_{i \in A_j^m} g^m(f_i^m \otimes (x_i^m - x_j^m)),$$

where $A_j^m$ is the set of associated radar points, $x_i^m$ is the coordinates of the associated radar point (e.g., two-dimensional coordinates), $x_j^m$ is the coordinate of cell's center (e.g., two-dimensional coordinates), $\otimes$ denotes the concatenation operation, $f_i^m$ is the feature vector for the radar point, and $g^m(\ )$ is a multi-layer perceptron with learnable weights shared across all cells. As shown in 312, in some implementations, the associated radar points $A_j^m$ can be calculated using a nearest neighbor algorithm with a distance threshold. For example, in some implementations, a K Nearest Neighbor (KNN) algorithm can be used. Other types of graph association algorithms can similarly be used. This can compensate for positional errors in the raw radar data. Thus, radar points within the threshold distance from a particular cell in the coordinate frame can be mapped to the particular cell.

The spatial features 312 can then be input into the radar temporal network 320 and combined for all sweeps. For example, for each cell j, a spatio-temporal feature vector $h^j$ can be determined by concatenating the per sweep spatial features $h_j^m$ and using a multi-layer perceptron to combine them.

Similarly, the LIDAR data 302 can be input into the LIDAR subnetwork 330 to generate one or more LIDAR features 332. For example, a sequence of L past LIDAR sweeps be input into the LIDAR subnetwork 330. For LIDAR points in each sweep, the points can be discretized to create an occupancy grid. For example, in a two-dimensional top-down cartesian grid, LIDAR points can be discretized using x and y dimensions. Further, a z dimension can be discretized to create a multi-channel binary occupancy feature for each cell in a coordinate frame. The temporal, per-sweep occupancy features can then be concatenated and used as an input to a lightweight network for generate (e.g., learn, extract) spatio-temporal LIDAR features 332 for cells in the coordinate frame. The features 332 can include, for example, a heading and/or shape of an object indicated in surrounding environment.

A map subnetwork 340 can similarly be configured to generate (e.g., extract, learn) features 342 from input map data 306. For example, in some implementations, the map data 306 can be high-definition (HD) image data. The image data can be rasterized to generate a coordinate frame with various information, such as lane locations, etc.

Each of the subnetworks 310/320, 330, and 340 can thus respectively generate features which can then be combined to generate fused feature data. For example, the respective features generated by the subnetworks can be input into a multi-scale fusion backbone 350. An example multi-scale fusion backbone 350 is discussed in greater detail with respect to FIG. 4.

The fused features (e.g., the output from the multi-scale fusion backbone 350) can then be input into a prediction head 360. The prediction head 360 can include one or more convolutional layers with learnable weights. The prediction head 360 can output one or more predicted trajectories 370 for detected objects. For example, as shown, detected objects (depicted as boxes) can each have associated predicted trajectories (depicted as dotted lines) which can indicate a future path of travel for the detected objects. An example prediction head 360 is discussed in greater detail with respect to FIG. 4.

Figure 4:
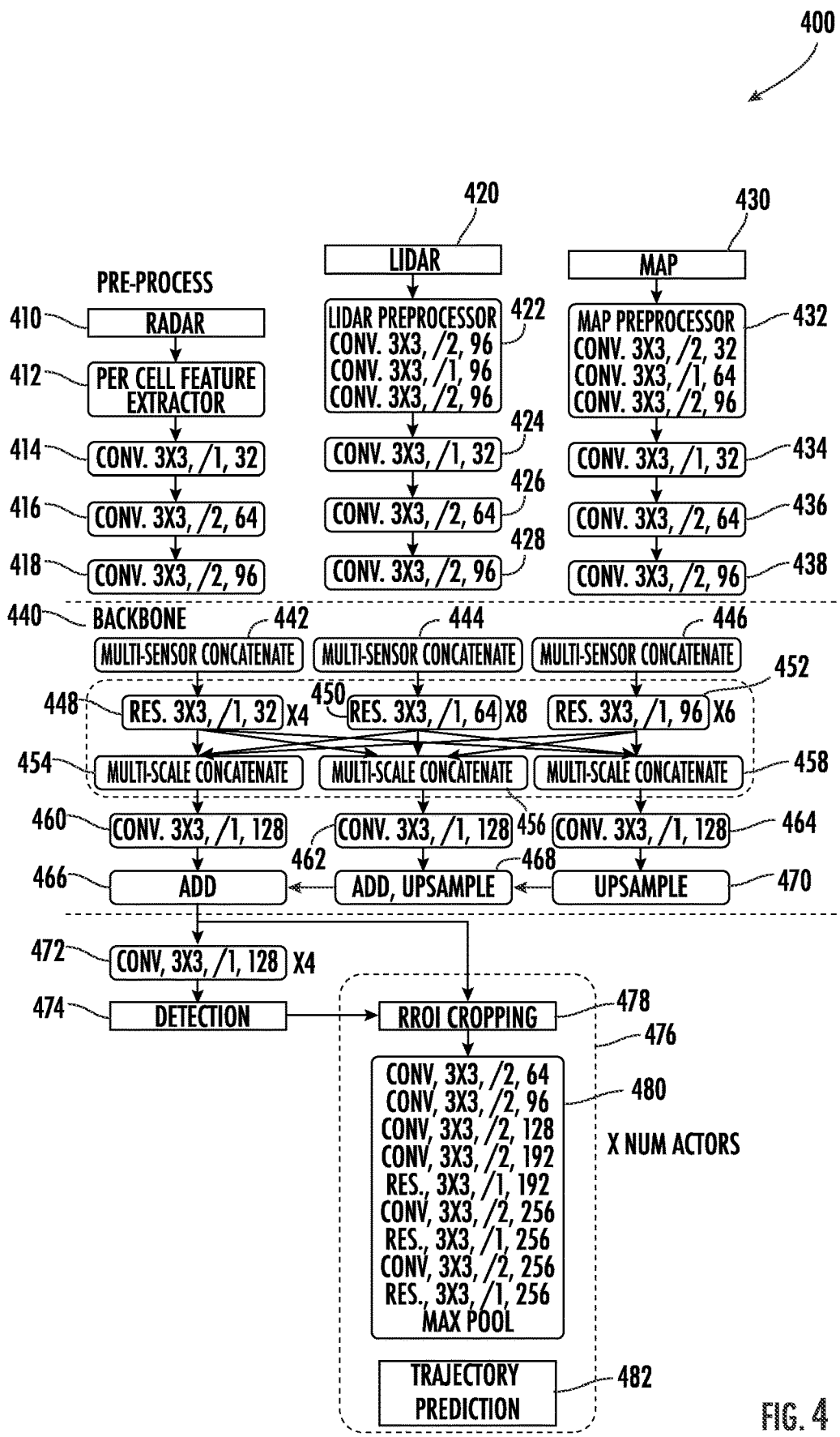
FIG. 4 depicts a diagram of an example network model architecture according to example aspects of the present disclosure.

Referring now to FIG. 4, an example network model 400 according to example aspects of the present disclosure is depicted. The network model 400 (and/or portions thereof) can correspond to the network model 300 depicted in FIG. 3. As shown, each of the radar data 410, LIDAR data 420, and map data 430 can be input into a respective subnetwork.

As shown, the radar data 410 can be input into a per cell feature extractor 412. In some implementations, the radar data 410 can be pre-processed, such as transformed into a most recent radar sweep coordinate frame. The output from the per cell feature extractor 412 can be input into one or more convolutional layers 414, 416, and/or 418. Each of the convolutional layers 414, 416, and/or 418 can have a different number of channels, features, and/or be at different resolutions. For example, in the example implementation shown in FIG. 4, the convolutional layers 414, 416, and/or 418 (e.g., the learnable operators thereof) are denoted by op, kernel, stride, and number of features. In some implementations, the convolutional layers 414, 416 and/or 418 can be, for example, parametric continuous convolutional layers. The output from the radar data subnetwork (e.g., the last convolutional layer 418) can be input into a multi-scale fusion backbone 440.

The LIDAR data 420 can be input into a LIDAR preprocessor 422. The preprocessor 422 can include one or more convolutional layers. The output from the preprocessor 422 can be input into one or more convolutional layers 424, 426, and/or 428. Each of the convolutional layers 424, 426, and/or 428 can have a different number of channels, features, and/or be at different resolutions. For example, in the example implementation shown in FIG. 4, the preprocessor 422 and the convolutional layers 424, 426, and/or 428 (e.g., the learnable operators thereof) are denoted by op, kernel, stride, and number of features. The output from the LIDAR data subnetwork (e.g., the last convolutional layer 428) can be input into the multi-scale fusion backbone 440.

The map data 430 can be input into a map preprocessor 432. The preprocessor 432 can include one or more convolutional layers. The output from the preprocessor 432 can be input into one or more convolutional layers 434, 436, and/or 438. Each of the convolutional layers 434, 436, and/or 438 can have a different number of channels, features, and/or be at different resolutions. For example, in the example implementation shown in FIG. 4, the preprocessor 432 and the convolutional layers 434, 436, and/or 438 (e.g., the learnable operators thereof) are denoted by op, kernel, stride, and number of features. The output from the map data subnetwork (e.g., the last convolutional layer 438) can be input into the multi-scale fusion backbone 440.

As shown, the multi-scale fusion backbone 440 can include a plurality of layers 442-470 which can concatenate the features from multiple sensors at different scales. For example, in some implementations, the multi-scale fusion backbone 440 can include one or more inception blocks with a plurality of branches with different down-sampling ratios (e.g., 1×, 2×, 4×). In some implementations, three sequential inception blocks can be used with a feature pyramid network to compute features for each coordinate frame cell. The features from all modalities at multiple scales can be concatenated and provided as an input to the first inception block. The fused feature data can be received as an output of the final inception block 472.

The output from the multi-scale fusion backbone 440 can be input into a detection layer 474. The detection layer 474 can detect one or more objects from the fused sensor data. In some implementations, the detection layer 474 can be, for example, a full convolutional single shot detector. Each detected object can then be passed through the prediction head 476 (e.g., a convolutional neural network) to generate trajectory predictions. Each detected object can first be passed through a RROI cropping layer 478 and passed through one or more convolutional layers 480. For example, in the example implementation shown in FIG. 4, the convolutional layers 480 can include a plurality of convolutional layers and a max pooling layer. In the example implementation shown in FIG. 4, the convolutional layers 480 (e.g., the learnable operators thereof) are denoted by op, kernel, stride, and number of features.

Prediction data 482 can be received as an output of the network model 400. For example, the prediction data 482 can be received as an output of the final layer of the prediction head 476. In some implementations, the prediction data 482 can be received on a per actor basis (e.g., for each actor/detected object). In some implementations, the generated predictions (e.g., prediction data 482) can include probabilistic multi-hypothesis trajectory predictions for each actor/detected object. For example, a plurality of possible trajectories with associated probabilities can be predicted by the network model 400.

Figure 5A:
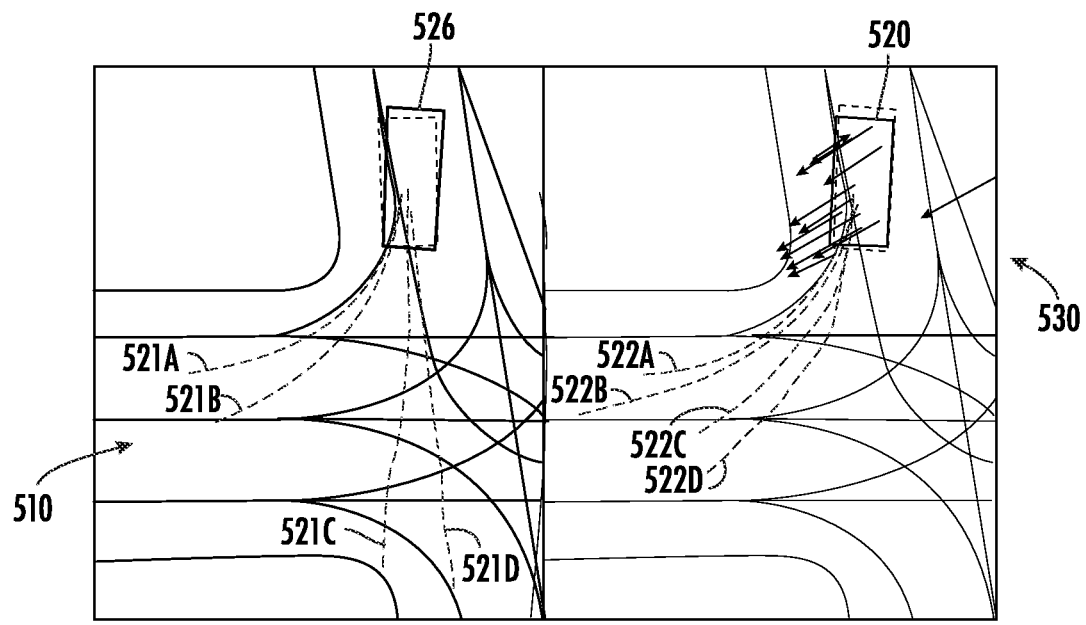
FIG. 5A depicts a comparison of example prediction scenarios according to example aspects of the present disclosure.

The systems and methods according to example aspects of the present disclosure can allow for improved trajectory prediction using fused feature data from radar, LIDAR, and/or map data. For example, referring now to FIG. 5A, an example prediction scenario comparison is depicted. As shown at 510, the left side depicts a detected object 520 (e.g., a vehicle 520) and a plurality of predicted trajectories 521A-D using LIDAR data and map data as inputs into a joint perception and prediction model. As depicted, two of the predicted trajectories 521A and 521B indicate that the vehicle 520 is making a turn, while two of the predicted trajectories 521C and 521D indicate that the vehicle 520 will go straight. In this example scenario, the vehicle 520 had just begun slowing down (e.g., decelerating) for the turn. However, the change in velocity can be difficult to measure using LIDAR alone, so the joint perception and prediction model gives a high probability for the trajectories which go straight. However, as shown on the right side at 530, when radar data (depicted by arrows) is included as an input into the joint perception and prediction models of the present disclosure, all predicted trajectories 522 A-D indicate that the vehicle 520 will turn.

Figure 5B:
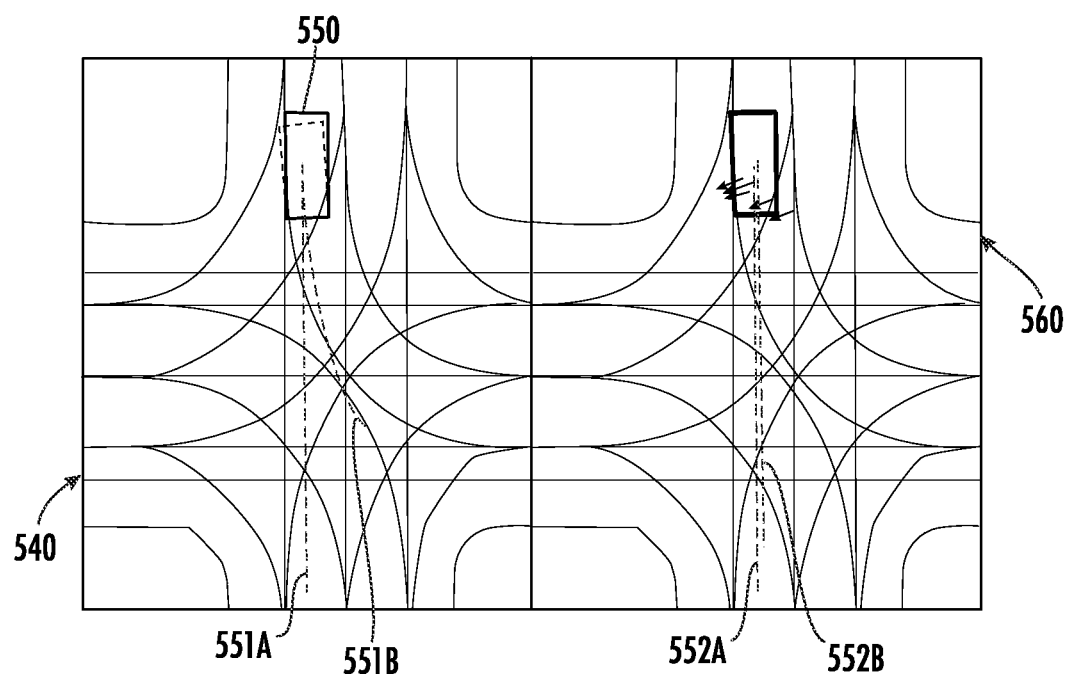
FIG. 5B depicts a comparison of example prediction scenarios according to example aspects of the present disclosure.

Similarly, referring to FIG. 5B, at 540, a detected object 550 (e.g., a vehicle 550) and two predicted trajectories 551A-B are shown, one going straight (551A) and one turning (551B). In this scenario 540, an occlusion has caused the LIDAR data to be sparse, which leads to an incorrect prediction that the vehicle 550 is turning. However, as shown on the right side at 560, when radar data (depicted by arrows) is included as an input into the joint perception and prediction models of the present disclosure, all predicted trajectories 552A-B indicate that the vehicle 550 will go straight.

Figure 6:
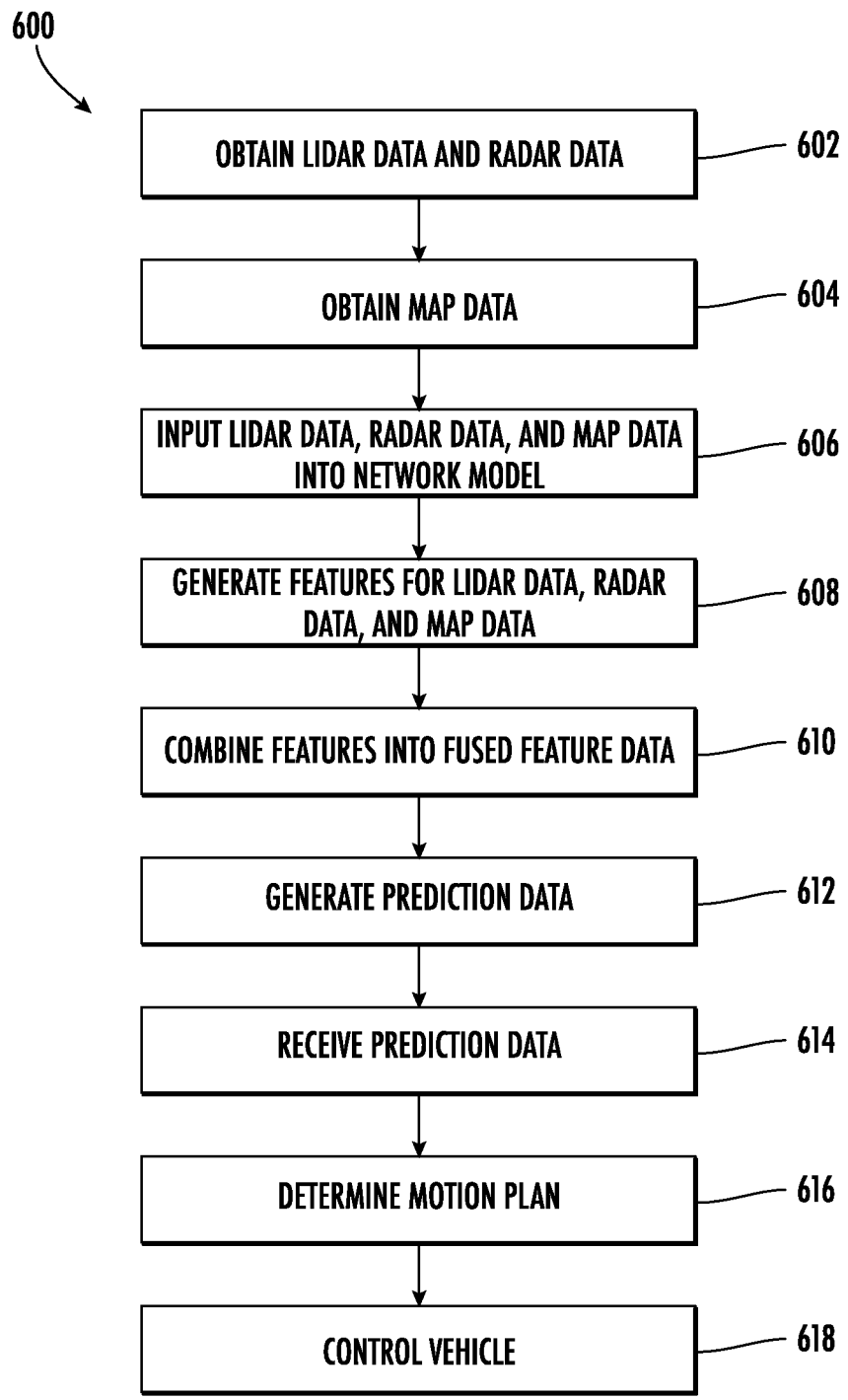
FIG. 6 depicts a flow diagram of an example method according to example aspects of the present disclosure.

Referring now to FIG. 6, a flow diagram of an example method 600 according to example aspects of the present disclosure is depicted. One or more portion(s) of the method 600 can be implemented by a computing system that includes one or more computing devices such as, for example, the computing systems described with reference to the other figures (e.g., a vehicle computing system, etc.). Each respective portion of the method 600 can be performed by any (or any combination) of one or more computing devices. Moreover, one or more portion(s) of the method 600 can be implemented as an algorithm on the hardware components of the device(s) described herein (e.g., as in FIGS. 1, 8, 9, etc.), for example, to help operate an autonomous vehicle. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 6 is described with reference to elements/ terms described with respect to other systems and figures for exemplary illustrated purposes and is not meant to be limiting. One or more portions of method 600 can be performed additionally, or alternatively, by other systems.

At 602, the computing system can obtain LIDAR data and radar data. For example, a computing system on board an autonomous vehicle can obtain LIDAR data and radar data associated with an environment of the autonomous vehicle. The LIDAR data can be multi-dimensional (e.g., two-dimensional, three-dimensional) point cloud data obtained for one or more sweeps. The radar data can be reflected radio waves (e.g., radar peaks detected using a CFAR algorithm) obtained for one or more sweeps.

At 604, the computing system can obtain map data associated with the LIDAR data and the radar data. In some implementations, the map data can be HD map data. The map data can correspond to, for example, the surrounding environment of the autonomous vehicle. The map data can include information indicative of the surrounding environment, such as the location of lanes, etc.

At 606, the computing system can input the LIDAR data, radar data, and map data into a network model. For example, the network model can include one or more machine-learned models. In some implementations, the network model can include subnetworks configured to process each data input, as described herein.

In some implementations, inputting the LIDAR data, radar data, and map data into the network model can include preprocessing the radar data. For example, in some implementations, the radar data can be transformed into a coordinate frame associated with the most recent radar sweep in the radar data. For example, the coordinate frame can include a plurality of cells, such as a two-dimensional cartesian or arc grid.

At 608, the computing system can generate one or more features for each of the LIDAR data, the transformed radar data, and the map data using the network model. For example, in some implementations, a plurality of subnetworks can be configured to process each respective data input. Each subnetwork can be configured to generate a respective set of features for the respective input data.

In some implementations, generating the one or more features for the transformed radar data can include determining a feature vector for each cell in the coordinate frame for each sweep in the radar data and concatenating the per sweep feature vectors for each cell. In some implementations, the feature vector for each cell in the coordinate frame for each sweep in the radar data can be determined using a nearest neighbor algorithm.

In some implementations, generating the one or more features for the LIDAR data can include discretizing the LIDAR data points into an occupancy coordinate frame comprising a plurality of cells for each sweep and concatenating the per sweep occupancy features for each cell.

In some implementations, generating the one or more features for the map data can include rasterizing the map data into a coordinate frame comprising a plurality of cells.

At 610, the computing system can combine the one or more generated features for each of the LIDAR data, the radar data, and the map data to generate fused feature data. For example, in some implementations, a multi-scale fusion backbone can concatenate the generated features for multiple sensors at multiple scales.

At 612, the computing system can generate prediction data based at least in part on the fused feature data. For example, the fused feature data can be input into a prediction head of the network model. For example, the prediction head can include an object detector, and each detected object can be input into a trajectory prediction network. In some implementations, the generated prediction data can include a single hypothesis trajectory prediction for each of the one or more detected objects. In some implementations, the prediction data can include a probabilistic multi-hypothesis trajectory prediction for each of the one or more detected objects.

At 614, the computing system can receive the generated prediction data from the network model. For example, in some implementations, the prediction data can be received as an output of the prediction head. The respective predicted trajectory for each detected object can be a predicted trajectory for a future time period. In some implementations, the predicted trajectory can include one or more waypoints.

At 616, the computing system can determine a motion plan based at least in part on the respective predicted trajectory for the one or more detected objects for example, the predicted trajectories can be provided to a motion planning system, which can determine a motion plan to navigate through the autonomous vehicle's environment in response to the predicted trajectories for the detected objects.

At 618, the computing system can control the autonomous vehicle based at least in part on the motion plan. For example, a vehicle controller can send commands signals to one or more vehicle control systems (e.g., acceleration system, turning system, braking system, etc.).

Figure 7:
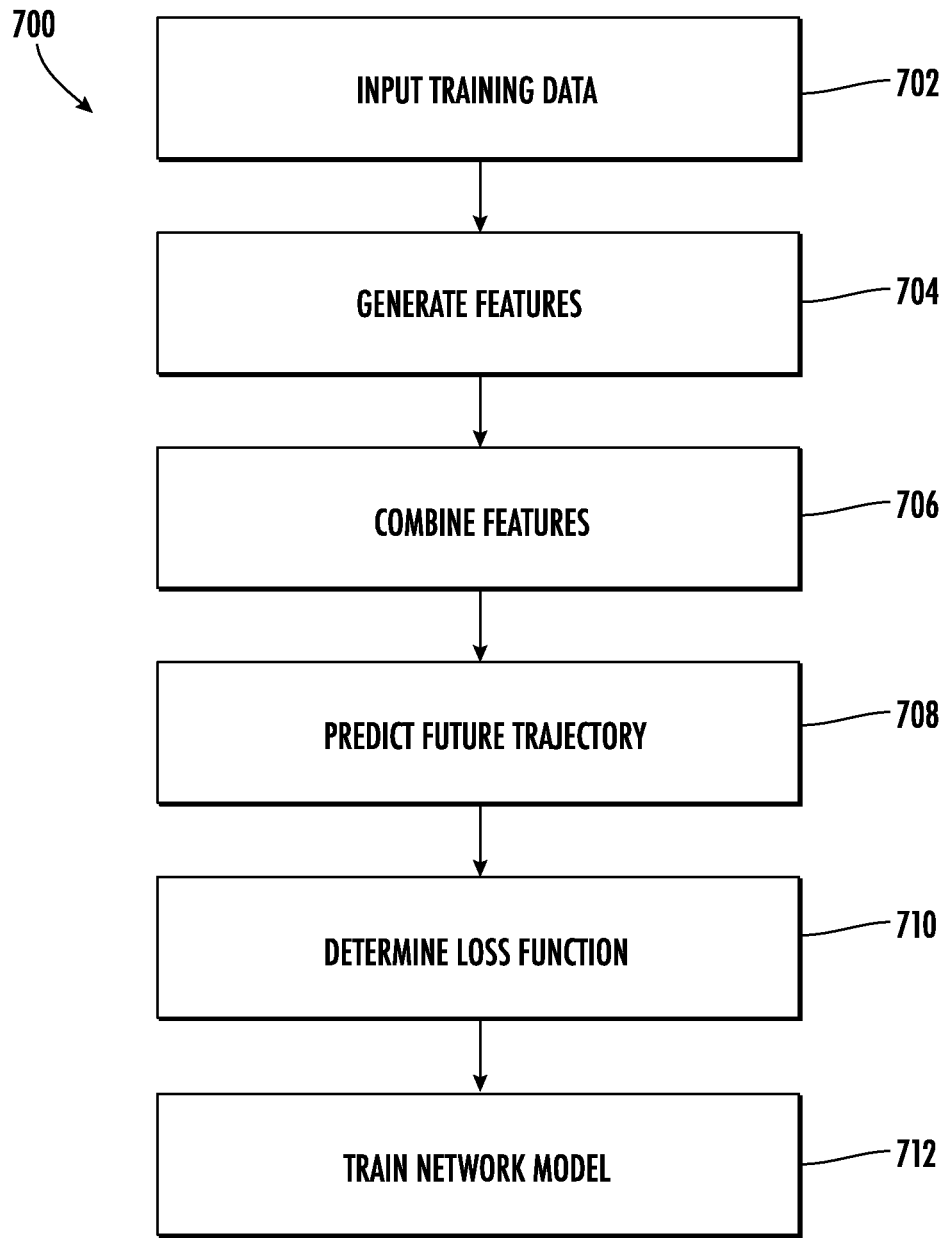
FIG. 7 depicts a flow diagram of an example method according to example aspects of the present disclosure.

FIG. 7 depicts a flow diagram of a method 700 according to example embodiments of the present disclosure. One or more portion(s) of the method 700 can be implemented by a computing system that includes one or more computing devices such as, for example, the computing systems described with reference to the other figures (e.g., a vehicle computing system, remote computing system, etc.). Each respective portion of the method 700 can be performed by any (or any combination) of one or more computing devices. Moreover, one or more portion(s) of the method 700 can be implemented as an algorithm on the hardware components of the device(s) described herein (e.g., as in FIGS. 1, 8, 9, etc.), for example, to help generate time-corrected intermediate environmental representations. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 7 is described with reference to elements/terms described with respect to other systems and figures for exemplary illustrated purposes and is not meant to be limiting. One or more portions of method 700 can be performed additionally, or alternatively, by other systems.

At 702, the method 700 can include inputting training data into a network model. For example, the network model can be a trajectory prediction model comprising a plurality of subnetworks configured to extract one or more features from the input data and a trajectory prediction machine-learned model. In some implementations, inputting the training data into the network model can include inputting radar data, LIDAR data, and map data into each respective subnetwork. The training data can include, for example, data previously acquired during one or more autonomous vehicle driving sessions. For example, sensor data comprising LIDAR data sweeps and radar data sweeps can be obtained during an autonomous driving session. The acquired data can be associated with map data.

At 704, the method 700 can include generating one or more features for each of the LIDAR data, the radar data, and the map data. The features can be generated by the network model, similar to step 608 in method 600.

At 706, the method 700 can include combining the one or more generated features for each of the LIDAR data, the radar data, and the map data to generate fused feature data. The fused feature data can be generated by the network model, similar to step 610 in method 600.

At 708, the method 700 can include predicting a future trajectory for one or more objects detected by the network model. The predicted trajectories can be generated by the network model, similar to step 612 and method 600.

At 710, the method 700 can include determining a loss function for the network model based at least in part on a comparison between the respective predicted future trajectory for the one or more objects and a ground truth future trajectory.

For example, in some implementations, a multi-task loss function defined as a weighted sum of a detection loss and a trajectory loss: $\mathcal{L}_{total} = \mathcal{L}_{det} + \mathcal{L}_{traj}$ can be determined. For example, the detection loss ($\mathcal{L}_{det}$) can be a multi-task loss comprising a weighted sum of a classification and regression loss: $\mathcal{L}_{det} = \alpha \mathcal{L}_{det}^{cls} + \mathcal{L}_{det}^{reg}$. The classification loss can be trained using a focal loss for each coordinate frame cell for being at the center of a particular object class. In some implementations, each object i can be parameterized by its center $(x_i, y_i)$, orientation $(\Theta_i)$, and size $(w_i, h_i)$. In some implementations, smooth L1 loss can be used to train regression parameters of each object.

In some implementations, the trajectory data can be a single-hypothesis trajectory, while in others, it can be a multi-hypothesis trajectory. The trajectory loss $\mathcal{L}_{traj}$ can be determined by considering each waypoint at time t of a trajectory j to be a Laplace distribution (e.g., 2D) parameterized by its position $(x_j^t, y_j^t)$ and scale $(\sigma_{j,x}^t, \sigma_{j,y}^t)$. A sum of KL divergence between a ground truth and predicted distribution of all waypoints can be used as a regression loss. For single hypothesis predictions, the prediction loss may contain only a single component: $\mathcal{L}_{traj} = \mathcal{L}_{traj}^{reg}$. For multiple hypothesis predictions, the prediction loss may contain regression and classification losses: $\mathcal{L}_{traj} = \mathcal{L}_{traj}^{reg} + \mathcal{L}_{traj}^{cls}$. In some implementations, a cross-entropy loss can be used for learning the confidence of each predicted hypothesis.

In some implementations, the ground truth future trajectory can be determined from the data previously acquired during the one or more autonomous vehicle driving sessions. For example, the predicted trajectory for detected objects obtained from the network model can be compared to a ground truth detection and trajectory prediction derived from the previously-acquired data at a future time period. For example, a trajectory prediction for an object 3 seconds into the future can be compared to an actual trajectory for the detected object derived from the sensor data.

At 712, the method 700 can include training the network model based at least in part on the loss function. According to example aspects of the present disclosure, the network model can be trained from end-to-end. For example, in some implementations, stochastic gradient descent (SGD) using backpropagation of errors can be used to train the network model using a loss function which includes a detection loss parameter and a trajectory loss parameter. In some implementations, an ADAM optimizer can be used to train the model. Other suitable training methods can similarly be used. In this way, the network models according to example aspects of the present disclosure can be trained from end-to-end to both perceive and predict trajectories for detected objects using raw sensor input data, including radar data.

Figure 8:
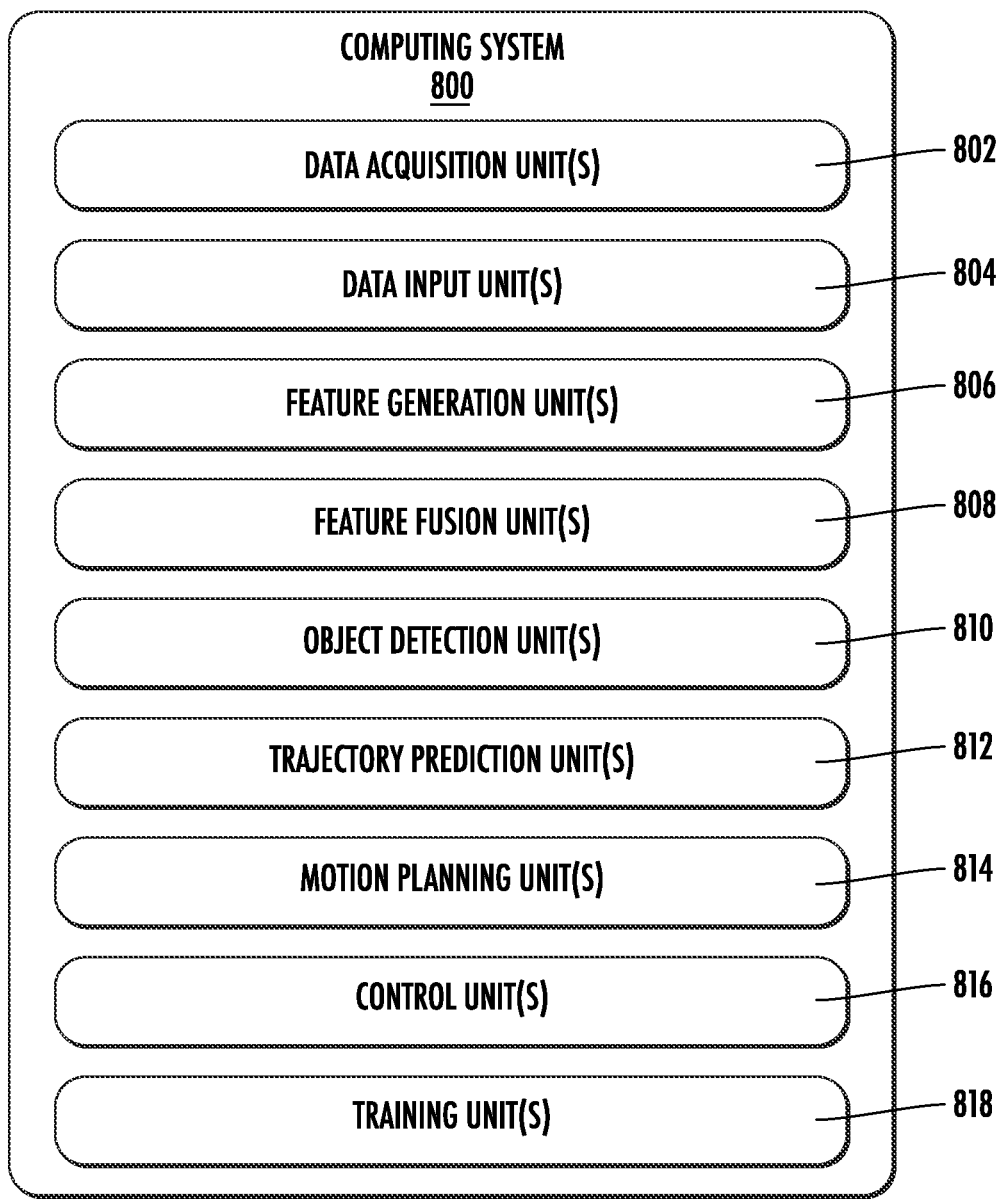
FIG. 8 depicts a diagram of an example system according to example aspects of the present disclosure.

FIG. 8 depicts an example system 800 with various means for performing operations and functions according to example implementations of the present disclosure. Various means can be configured to perform the methods and processes described herein. For example, a computing system can include data acquisition unit(s) 802, data input unit(s) 804, feature generation unit(s) 806, feature fusion unit(s) 808, object detection unit(s) 810, trajectory prediction unit(s) 812, motion planning unit(s) 814, control unit(s) 816, training unit(s) 818, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., data acquisition unit(s) 802, etc.) can be configured to obtain sensor data and/or map data associated with an environment of an autonomous vehicle. The sensor data can include multi-dimensional (e.g., two-dimensional, three-dimensional) sensor data such as, for example, LIDAR point cloud data comprising one or more sweeps. The sensor data can further include radar data, such as detected peaks in reflected radio waves. The map data can include HD map data associated with the surrounding environment in which the sensor data was obtained. The means (e.g., the data input unit(s) 804, etc.) can be configured to input the data into a network model. For example, each of the radar data, LIDAR data, and/or map data can be input into a respective subnetwork of a network model.

The means (e.g., the feature generation unit(s) 806 can be configured to generate (e.g., extract, learn) one or more features for each of the data inputs. For example, the means (e.g., the feature generation unit(s) 806, etc.) can be configured to transform radar data into a coordinate frame associated with a most recent sweep, determine a feature vector for each cell in the coordinate frame for each sweep in the radar data, and concatenate the per sweep feature vectors for each cell. The means (e.g., the feature generation unit(s) 806, etc.) can similarly be configured to discretize the LIDAR data points into an occupancy coordinate frame comprising a plurality of cells for each sweep and concatenating the per sweep occupancy features for each cell. The means (e.g., the feature generation unit(s) 806, etc.) can be configured to rasterize map data into a coordinate frame comprising a plurality of cells. The means (e.g., the feature fusion unit(s) 808, etc.) can be configured to generate one or more fused features. For example, a multi-scale fusion backbone can perform early fusion of the features generated for each of the radar data, LIDAR data, and map data.

The means (e.g., the object detection unit(s) 810, etc.) can be configured to detect one or more objects. For example, the fused feature data can be input into an object detector, such as a single shot detector. The means (e.g., the trajectory prediction unit(s) 812, etc.) can be configured to predict a trajectory for each detected object. For example, for each detected object, the output of the object detector can be input into a prediction head. The prediction had can be configured to generate prediction data, which can include single hypothesis predicted trajectories and/or multi-hypothesis predicted trajectories.

The means (e.g., motion planning unit(s) 814, etc.) can be configured to generate a motion plan based at least in part on the predicted trajectories. The motion plan can include a trajectory that was developed based on the detected object(s) and/or future location(s) of the detected object(s). The means (e.g., control unit(s) 920, etc.) can be configured to initiate a motion control of an autonomous vehicle based at least in part on the motion plan and/or another action (e.g., service action).

The means (e.g., the training unit(s) 818, etc.) can be configured to train a network model. For example, a network model can be trained from end-to-end using a loss function comprising a detection loss parameter and a trajectory loss parameter.

Figure 9:
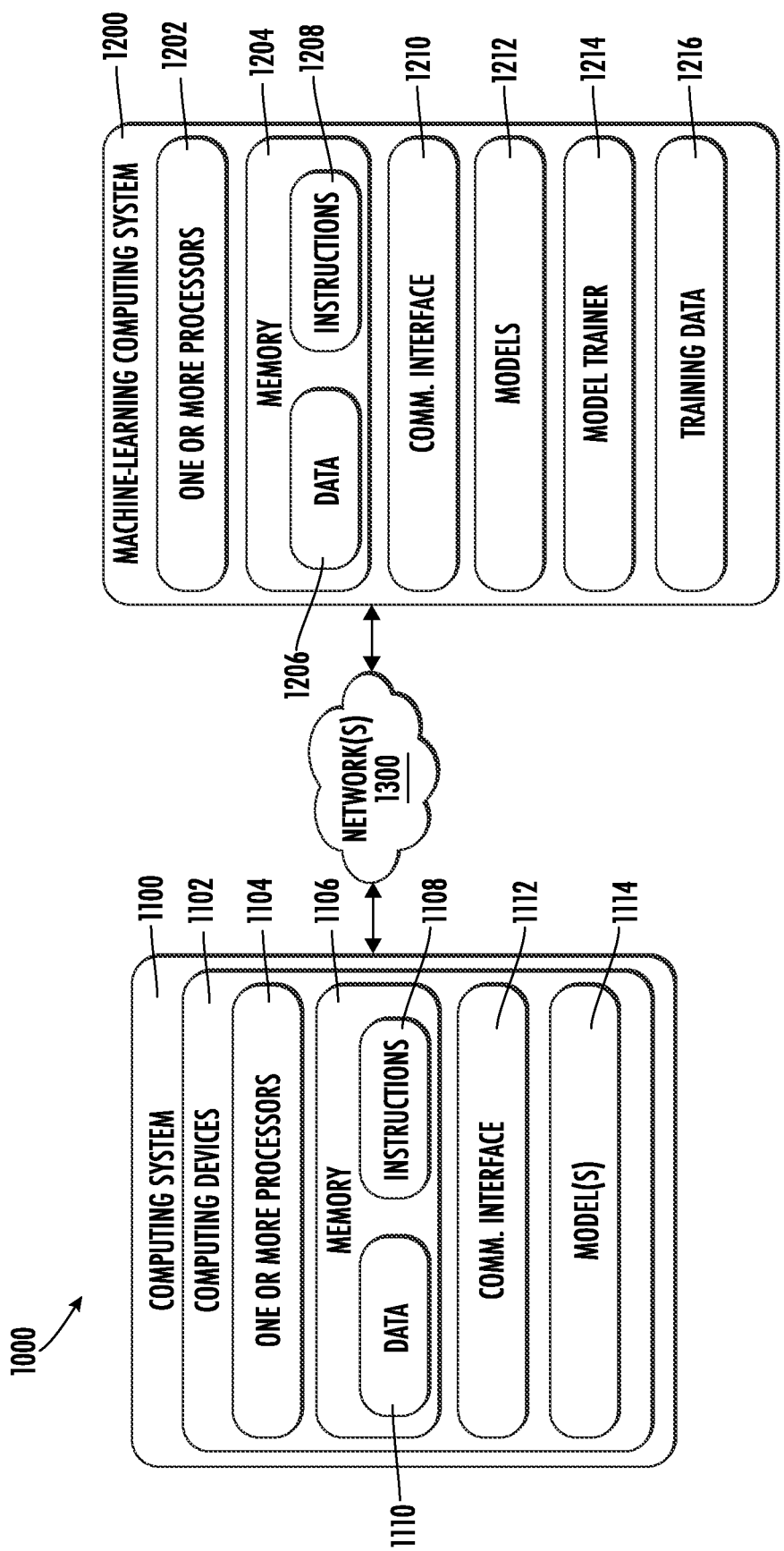
FIG. 9 depicts a diagram of an example system according to example aspects of the present disclosure.

FIG. 9 depicts an example computing system 1000 according to example aspects of the present disclosure. The example system 1000 can include the computing system 1100 and a machine learning computing system 1200 that are communicatively coupled over one or more network(s) 1300. As described herein, the computing system 1100 can be implemented onboard a computing system such as that of a vehicle (e.g., as a portion of the vehicle computing system) and/or can be remote therefrom (e.g., as portion of an operations computing system). In either case, a vehicle computing system can utilize the operations and model(s) of the computing system 1100 (e.g., locally, via wireless network communication, etc.).

The computing system 1100 can include one or more computing device(s) 1102. The computing device(s) 1102 of the computing system 1100 can include processor(s) 1104 and a memory 1106. The one or more processors 1104 can be any suitable processing device (e.g., a processor core, a microprocessor, an ASIC, a FPGA, a controller, a microcontroller, etc.) and can be one processor or a plurality of processors that are operatively connected. The memory 1106 can include one or more non-transitory computer-readable storage media, such as RAM, ROM, EEPROM, EPROM, one or more memory devices, flash memory devices, etc., and combinations thereof.

The memory 1106 can store information that can be obtained by the one or more processors 1104. For instance, the memory 1106 (e.g., one or more non-transitory computer-readable storage mediums, memory devices) can include computer-readable instructions 1108 that can be executed by the one or more processors 1104. The instructions 1108 can be software written in any suitable programming language or can be implemented in hardware. Additionally, or alternatively, the instructions 1108 can be executed in logically and/or virtually separate threads on processor(s) 1104.

For example, the memory 1106 can store instructions 1108 that when executed by the one or more processors 1104 cause the one or more processors 1104 (the computing system 1100) to perform operations such as any of the operations and functions of a vehicle computing system, and/or for which the vehicle computing system is configured, as described herein, the operations for generating prediction data using fused feature data, generating autonomy outputs/controlling motion (e.g., one or more portions of methods 600 and 700), and/or any other operations and functions, as described herein.

The memory 1106 can store data 1110 that can be obtained (e.g., received, accessed, written, manipulated, generated, created, stored, etc.). The data 1110 can include, for instance, sensor data, map data, feature data, fused feature data, object detection data, trajectory prediction data, autonomy outputs, perception data, prediction data, motion planning data, control signals, models, times, and/or other data/information described herein. In some implementations, the computing device(s) 1102 can obtain data from one or more memories that are remote from the computing system 1100.

The computing device(s) 1102 can also include a communication interface 1112 used to communicate with one or more other system(s) (e.g., other systems onboard and/or remote from a vehicle, the other systems of FIG. 9, etc.). The communication interface 1112 can include any circuits, components, software, etc. for communicating via one or more networks 1300. In some implementations, the communication interface 1112 can include, for example, one or more of a communications controller, receiver, transceiver, transmitter, port, conductors, software and/or hardware for communicating data/information.

According to an aspect of the present disclosure, the computing system 1100 can store or include one or more machine-learned models 1114. As examples, the machine-learned models 1114 can be or can otherwise include various machine-learned models such as, for example, network models, subnetworks, neural networks (e.g., deep neural networks), support vector machines, decision trees, ensemble models, k-nearest neighbors models, Bayesian networks, or other types of models including linear models and/or non-linear models. Example neural networks include feed-forward neural networks (e.g., convolutional neural networks, parametric continuous convolutions, etc.), recurrent neural networks (e.g., long short-term memory recurrent neural networks, etc.), and/or other forms of neural networks. The machine-learned models 1114 can include the machine-learned models of FIGS. 3, 4, and/or other model(s), as described herein.

In some implementations, the computing system 1100 can receive the one or more machine-learned models 1114 from the machine learning computing system 1200 over the network(s) 1300 and can store the one or more machine-learned models 1114 in the memory 1106 of the computing system 1100. The computing system 1100 can use or otherwise implement the one or more machine-learned models 1114 (e.g., by processor(s) 1104). In particular, the computing system 1100 can implement the machine learned model(s) 1114 to generate trajectory prediction data, autonomy output(s), etc.

The machine learning computing system 1200 can include one or more processors 1202 and a memory 1204. The one or more processors 1202 can be any suitable processing device (e.g., a processor core, a microprocessor, an ASIC, a FPGA, a controller, a microcontroller, etc.) and can be one processor or a plurality of processors that are operatively connected. The memory 1204 can include one or more non-transitory computer-readable storage media, such as RAM, ROM, EEPROM, EPROM, one or more memory devices, flash memory devices, etc., and combinations thereof.

The memory 1204 can store information that can be accessed by the one or more processors 1202. For instance, the memory 1204 (e.g., one or more non-transitory computer-readable storage mediums, memory devices) can store data 1206 that can be obtained (e.g., generated, retrieved, received, accessed, written, manipulated, created, stored, etc.). In some implementations, the machine learning computing system 1200 can obtain data from one or more memories that are remote from the machine learning computing system 1200.

The memory 1204 can also store computer-readable instructions 1208 that can be executed by the one or more processors 1202. The instructions 1208 can be software written in any suitable programming language or can be implemented in hardware. Additionally, or alternatively, the instructions 1208 can be executed in logically and/or virtually separate threads on processor(s) 1202. The memory 1204 can store the instructions 1208 that when executed by the one or more processors 1202 cause the one or more processors 1202 to perform operations. The machine learning computing system 1200 can include a communication interface 1210, including devices and/or functions similar to that described with respect to the computing system 1100.

In some implementations, the machine learning computing system 1200 can include one or more server computing devices. If the machine learning computing system 1200 includes multiple server computing devices, such server computing devices can operate according to various computing architectures, including, for example, sequential computing architectures, parallel computing architectures, or some combination thereof.

In addition or alternatively to the model(s) 1114 at the computing system 1100, the machine learning computing system 1200 can include one or more machine-learned models 1212. As examples, the machine-learned models 1212 can be or can otherwise include various machine-learned models such as, for example, network models, subnetworks, neural networks (e.g., deep neural networks), support vector machines, decision trees, ensemble models, k-nearest neighbors models, Bayesian networks, or other types of models including linear models and/or non-linear models. Example neural networks include feed-forward neural networks (e.g., convolutional neural networks, parametric continuous convolutions, etc.), recurrent neural networks (e.g., long short-term memory recurrent neural networks, etc.), and/or other forms of neural networks. The machine-learned models 1212 can be similar to and/or the same as the machine-learned models 1114, and/or other model(s) described herein.

As an example, the machine learning computing system 1200 can communicate with the computing system 1100 according to a client-server relationship. For example, the machine learning computing system 1200 can implement the machine-learned models 1212 to provide a web service to the computing system 1100 (e.g., including on a vehicle, implemented as a system remote from the vehicle, etc.). For example, the web service can provide machine-learned models to an entity associated with a vehicle; such that the entity can implement the machine-learned model. Thus, machine-learned models 1212 can be located and used at the computing system 1100 (e.g., on the vehicle, at the operations computing system, etc.) and/or the machine-learned models 1212 can be located and used at the machine learning computing system 1200.

In some implementations, the machine learning computing system 1200 and/or the computing system 1100 can train the machine-learned models 1114 and/or 1212 through use of a model trainer 1214. The model trainer 1214 can train the machine-learned models 1114 and/or 1212 using one or more training or learning algorithms. One example training technique is backwards propagation of errors. In some implementations, the model trainer 1214 can perform endto-end training using a loss function comprising a detection loss parameter and a trajectory loss parameter. In some implementations, the model trainer 1214 can perform supervised training techniques using a set of labeled training data. In other implementations, the model trainer 1214 can perform unsupervised training techniques using a set of unlabeled training data. The model trainer 1214 can perform a number of generalization techniques to improve the generalization capability of the models being trained. Generalization techniques include weight decays, dropouts, or other techniques.

In particular, the model trainer 1214 can train a machine-learned model 1114 and/or 1212 based on a set of training data 1216. The training data 1216 can include previously acquired sensor data from one or more autonomous vehicle driving sessions. In some implementations, the training data 1216 can include simulated training data. In some implementations, the training data 1216 can be taken from the same vehicle as that which utilizes that model 1114/1212. In this way, the models 1114/1212 can be trained to determine outputs in a manner that is tailored to that particular system/vehicle. Additionally, or alternatively, the training data 1216 can be taken from one or more different vehicles than that which is utilizing that model 1114/1212. The model trainer 1214 can be implemented in hardware, firmware, and/or software controlling one or more processors.

The network(s) 108 can be any type of network or combination of networks that allows for communication between devices. In some embodiments, the network(s) 108 can include one or more of a local area network, wide area network, the Internet, secure network, cellular network, mesh network, peer-to-peer communication link and/or some combination thereof and can include any number of wired or wireless links. Communication over the network(s) 108 can be accomplished, for instance, via a network interface using any type of protocol, protection scheme, encoding, format, packaging, etc.

FIG. 9 illustrates one example system 1000 that can be used to implement the present disclosure. Other computing systems can be used as well. For example, in some implementations, the computing system 1100 can include the model trainer 1214 and the training dataset 1216. In such implementations, the machine-learned models 1114/1212 can be both trained and used locally at the computing system 1100 (e.g., at a vehicle).

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

It should be understood that each autonomous vehicle within the ecosystem (e.g., within a communication range) can perform the functions of a transmitter autonomous vehicle and the functions of a recipient autonomous vehicle as described above. As such, an autonomous vehicle can not only communicate compressed intermediate environmental representations to other autonomous vehicles but can also receive compressed intermediate environmental representations from other autonomous vehicles. In some implementations, the autonomous vehicle(s) can also, or alternatively, send and receive autonomy outputs (e.g., of the joint perception/prediction model) among one another.

What is claimed is:

1. A computing system, comprising:
one or more processors;
a memory comprising one or more tangible non-transitory computer-readable media, the media storing computer-readable instructions that when executed by the one or more processors cause the one or more processors to perform operations comprising:
obtaining, from one or more sensors of an autonomous vehicle, LIDAR data and radar data, the radar data comprising one or more radar sweeps, the LIDAR data comprising one or more LIDAR sweeps;
inputting the LIDAR data and the radar data into a network model comprising one or more machine-leaned models;
generating, by the network model, one or more features for each of the LIDAR data and the radar data, wherein generating the one or more features for the radar data comprises determining a feature vector for each cell in a coordinate frame and concatenating per sweep feature vectors for each cell;
combining, by the network model, the one or more generated features for each of the LIDAR data and the radar data to generate fused feature data;
generating, by the network model, prediction data based at least in part on the fused feature data; and
receiving, as an output of the network model, the prediction data, the prediction data comprising a respective predicted trajectory for a future time period for one or more detected objects.

2. The computing system of claim 1, wherein the operations further comprise:
determining a motion plan based at least in part on the respective predicted trajectory for the one or more detected objects; and controlling an autonomous vehicle based at least in part on the motion plan.

3. The computing system of claim 1, wherein combining, by the network model, the one or more generated features for each of the LIDAR data and the radar data to generate the fused feature data comprises:
receiving, as an output of a respective subnetwork of the network model, one or more respective generated features for each of the LIDAR data and the radar data;
inputting the one or more respective generated features for the LIDAR data and the radar data into a multi-scale fusion backbone of the network model; and
concatenating, by the multi-scale fusion backbone, the one or more respective generated features for the LIDAR data and the radar data to generate the fused feature data.

4. The computing system of claim 1, wherein the operations further comprise:
transforming the radar data into the coordinate frame associated with a most recent radar sweep in the radar data, the coordinate frame comprising a plurality of cells.

5. The computing system of claim 4, wherein the coordinate frame comprises a two-dimensional top-down grid comprising a cartesian grid or an arc grid.

6. The computing system of claim 1, wherein the feature vector for each cell in the coordinate frame for each sweep in the radar data is further determined using a graph between the cell and the radar data using a nearest neighbor algorithm.

7. The computing system of claim 1, wherein generating, by the network model, the one or more features for the LIDAR data comprises:
discretizing LIDAR data points into an occupancy coordinate frame comprising a plurality of cells for each sweep; and
concatenating per sweep occupancy features for each cell.

8. The computing system of claim 1, wherein the operations further comprise:
obtaining map data associated with the LIDAR data and the radar data; and
generating, by the network model, one or more features for the map data comprises rasterizing the map data into a coordinate frame comprising a plurality of cells; and
wherein the fused feature data is generated by combining the one or more features for the map data with the one or more features for each of the LIDAR data and the radar data.

9. The computing system of claim 1, wherein the network model has been trained form end-to-end using a loss function comprising a detection loss parameter and a trajectory loss parameter.

10. The computing system of claim 9, wherein the detection loss parameter comprises a classification loss parameter and a regression loss parameter.

11. The computing system of claim 1, wherein the prediction data comprises a probabilistic multi-hypothesis trajectory prediction for each of the one or more detected objects.

12. The computing system of claim 1, wherein the prediction data comprises a single hypothesis trajectory prediction for each of the one or more detected objects.

13. The computing system of claim 1, wherein generating, by the network model, the prediction data based at least in part on the fused feature data comprises inputting the fused feature data into a prediction head of the network model.

14. A computer-implemented method for training a trajectory prediction network model from end-to-end, the network model comprising a plurality of subnetworks configured to extract one or more features from input data and a trajectory prediction machine-learned model, the method comprising:
inputting training data into the network model, the training data comprising radar data comprising a plurality of sweeps, LIDAR data comprising a plurality of sweeps, and map data;
generating, by the network model, one or more features for each of the LIDAR data; the radar data, and the map data, wherein generating the one or more features for the radar data comprises determining a feature vector for each cell in a coordinate frame and concatenating per sweep feature vectors for each cell;
combining, by the network model, the one or more generated features for each of the LIDAR data, the radar data; and the map data to generate fused feature data;
predicting, by the network model, a respective future trajectory for one or more objects detected by the network model;
determining a loss function for the network model based at least in part on a comparison between the respective predicted future trajectory for the one or more Objects and a ground truth future trajectory; and training the network model based at least in part on the loss function.

15. The computer-implemented method for training the trajectory prediction network model from end-to-end of claim 14, wherein the loss function comprises a detection loss parameter and a trajectory loss parameter.

16. The computer-implemented method for training the trajectory prediction network model from end-to-end of claim 15, wherein the detection loss parameter comprises a classification loss parameter and a regression loss parameter.

17. The computer-implemented method for training the trajectory prediction network model from end-to-end of claim 14, wherein the training data comprises LIDAR data and radar data acquired during, one or more autonomous vehicle driving sessions.

18. An autonomous vehicle, comprising:
one or more LIDAR sensors configured to obtain sweeps of LIDAR data;
one or more radar sensors configured to obtain sweeps of radar data; and
a computing system, comprising:
one or more processors;
a memory comprising one or more tangible non-transitory computer-readable media, the media storing computer-readable instructions that when executed by the one or more processors cause the one or more processors to perform operations comprising:
obtaining, from the one or more LIDAR sensors, LIDAR data comprising one or more sweeps;
obtaining, from the one or more radar sensors, radar data comprising one OF more sweeps;
obtaining map data associated with the LIDAR data and the radar data;
inputting the LIDAR data, the radar data, and the map data into a network model comprising one or more machine-learned models;
generating, by the network model, one or more features for each of the LIDAR data, the radar data, and the map data, wherein generating the one or more features for the radar data comprises determining a feature vector for each cell in a coordinate frame and concatenating per sweep feature vectors for each cell;
combining, by the network model, the one or more generated features for each of the LIDAR data, the radar data, and the map data to generate fused feature data;
generating, by the network model, prediction data based at least in part on the fused feature data;
receiving, as an output of the network model, the prediction data, the prediction data comprising a respective predicted trajectory for a future time period for one or more detected objects;
determining a motion plan based at least in part on the respective predicted trajectory for the one or more detected objects; and controlling the autonomous vehicle based at least in part on the motion plan.

19. The autonomous vehicle of claim 18, wherein generating, by the network model, the one or more features for the radar data comprises:
transforming the radar data into a coordinate frame associated with a most recent radar sweep in the radar data, the coordinate frame comprising a plurality of cells;
determining a feature vector for each cell in the coordinate frame for each sweep in the radar data; and
concatenating the per sweep feature vectors for each cell.

* * * * *